United States Patent
Zhu

(10) Patent No.: US 12,408,170 B2
(45) Date of Patent: Sep. 2, 2025

(54) UPLINK INFORMATION TRANSMISSION METHOD AND APPARATUS, USER DEVICE AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 1102 days.

(21) Appl. No.: 17/418,935

(22) PCT Filed: Dec. 28, 2018

(86) PCT No.: PCT/CN2018/125071
§ 371 (c)(1),
(2) Date: Jun. 28, 2021

(87) PCT Pub. No.: WO2020/133281
PCT Pub. Date: Jul. 2, 2020

(65) Prior Publication Data
US 2022/0086885 A1    Mar. 17, 2022

(51) Int. Cl.
*H04W 72/21* (2023.01)
*H04W 72/044* (2023.01)
(Continued)

(52) U.S. Cl.
CPC ......... *H04W 72/21* (2023.01); *H04W 72/044* (2013.01); *H04W 72/1268* (2013.01); *H04W 74/0808* (2013.01)

(58) Field of Classification Search
CPC ............... H04W 72/21; H04W 72/044; H04W 72/1268; H04W 74/0808; H04W 72/0453; H04W 72/23
See application file for complete search history.

(56) References Cited

U.S. PATENT DOCUMENTS

2013/0203458 A1 * 8/2013 Charbit ................. H04L 5/0032
                                                           455/522
2014/0204854 A1    7/2014 Freda et al.
(Continued)

FOREIGN PATENT DOCUMENTS

CN    105101421 A    11/2015
CN    105636108 A    6/2016
(Continued)

OTHER PUBLICATIONS

ISA State Intellectual Property Office of the People's Republic of China, International Search Report Issued in Application No. PCT/CN2018/125071, Aug. 28, 2019, WIPO, 4 pages.
(Continued)

*Primary Examiner* — Ivan O Latorre
(74) *Attorney, Agent, or Firm* — SYNCODA LLC; Feng Ma

(57) ABSTRACT

A method for transmitting uplink information includes: obtaining uplink transmission configuration information sent by a base station, wherein the uplink transmission configuration information includes at least: a time-frequency range of target uplink resource, the target uplink resource is uplink transmission resource allocated by the base station to the user equipment in a target bandwidth part of an unlicensed spectrum; determining channel detection information corresponding to the target uplink resource, wherein the channel detection information includes: information indicating valid resource and information indicating invalid resource, the invalid resource is resource in the target uplink resource which fails in channel detection; and the valid resource is resource in the target uplink resource which succeeds in channel detection; and when invalid resource exists in the target uplink resource, determining a mode for transmitting the uplink information on available transmis-
(Continued)

sion resource according to the channel detection information.

18 Claims, 16 Drawing Sheets

(51) Int. Cl.
*H04W 72/1268* (2023.01)
*H04W 74/0808* (2024.01)

(56) References Cited

U.S. PATENT DOCUMENTS

| | | | | |
|---|---|---|---|---|
| 2016/0262167 | A1* | 9/2016 | Lan | H04W 72/542 |
| 2017/0034845 | A1* | 2/2017 | Liu | H04W 72/1268 |
| 2018/0034606 | A1* | 2/2018 | Ahn | H04B 7/0617 |
| 2018/0279149 | A1 | 9/2018 | Li et al. | |
| 2018/0317254 | A1* | 11/2018 | Hu | H04W 72/1268 |
| 2019/0229788 | A1* | 7/2019 | Zhang | H04L 5/0098 |
| 2019/0254074 | A1* | 8/2019 | Jeon | H04W 36/0085 |
| 2019/0260495 | A1* | 8/2019 | Nammi | H04L 1/0016 |
| 2019/0274167 | A1* | 9/2019 | Li | H04W 52/04 |
| 2020/0029245 | A1* | 1/2020 | Khoryaev | H04W 36/22 |
| 2020/0053799 | A1* | 2/2020 | Jeon | H04L 5/0048 |
| 2020/0068546 | A1* | 2/2020 | Wu | H04W 16/14 |
| 2020/0236677 | A1* | 7/2020 | Cui | H04W 72/23 |
| 2020/0281010 | A1* | 9/2020 | Jiang | H04W 72/23 |
| 2020/0314803 | A1* | 10/2020 | Zhang | H04W 74/006 |
| 2021/0153288 | A1* | 5/2021 | Cui | H04W 24/04 |
| 2021/0274551 | A1* | 9/2021 | Takata | H04W 72/21 |
| 2021/0314796 | A1* | 10/2021 | Hoang | H04W 72/04 |
| 2021/0329596 | A1* | 10/2021 | Freda | H04W 72/541 |
| 2021/0410164 | A1* | 12/2021 | Zhou | H04W 72/1268 |
| 2022/0086885 | A1* | 3/2022 | Zhu | H04W 72/21 |

FOREIGN PATENT DOCUMENTS

| | | |
|---|---|---|
| CN | 106162900 A | 11/2016 |
| CN | 107613566 A | 1/2018 |
| CN | 107949067 A | 4/2018 |
| CN | 108370573 A | 8/2018 |
| CN | 108809545 A | 11/2018 |
| CN | 108810905 A | 11/2018 |
| CN | 108886788 A | 11/2018 |
| WO | 2016101284 A1 | 6/2016 |
| WO | 2017025000 A1 | 2/2017 |
| WO | 2018030744 A1 | 2/2018 |

OTHER PUBLICATIONS

State Intellectual Property Office of the People's Republic of China, Office Action and Search Report Issued in Application No. 2018800033779, Sep. 30, 2022, 12 pages. (Submitted with Machine/Partial Translation).

ISA State Intellectual Property Office of the People's Republic of China, Written Opinion of the International Searching Authority Issued in Application No. PCT/CN2018/125071, Aug. 28, 2019, WIPO, 7 pages.

State Intellectual Property Office of the People's Republic of China, Office Action and Search Report Issued in Application No. 2018800033779, May 6, 2023, 14 pages.(Submitted with Machine Translation).

Qualcomm Incorporated RAN1, "Updated correction on CSI reference resource definition in LAA", 3GPP TSG-RAN WG1 Meeting #86bis, R1-1613722,Lisbon, Portugal, Oct. 10-14, 2016, 10 pages.

Panasonic, "Discussion on resource allocation for uplink control channel",3GPP TSG RAN WG1 NR Ad-Hoc#2, R1-1710937,Qingdao, P.R. China, Jun. 27-30, 2017,3 pages.

Huang Xiaoge et al,"Coexistence mechanism of LTE-U and WiFi systems in the unlicensed spectrum",Journal of Chongqing University of Posts and Telecommunications (Natural Science Edition), 8 pages.

Liu Shi-xiao et al,"A Solution to Reduce HARQ Process Delay in Unlicensed Spectrum",Science Technology and Engineering, Apr. 8, 2017, 5 pages.

Qualcomm Europe Inc.—Spain,RP-182767,"TR 38.889 v1.1.0 on Study on NR-based access to unlicensed spectrum; for approval"3GPP tsg_ran\tsg_ran,tsgr_82, Dec. 11, 2018, 120 pages.

Qualcomm Incorporated,"Enhancement to configured grants in NR unlicensed",3GPP TSG RAN WG1 Meeting #94, R1-1809482,Gothenburg, Sweden,Aug. 20-Aug. 24, 2018,6 pages.

ITL, "Discussion on RACH carrier selection for NR-U", 3GPP TSG-RAN WG2 Meeting #103, R2-1812813, Gothenburg, Sweden, Aug. 20-24, 2018, 2 pages.

* cited by examiner

UPLINK INFORMATION TRANSMISSION METHOD AND APPARATUS, USER DEVICE AND BASE STATION

CROSS-REFERENCE TO RELATED APPLICATIONS

The present application is a national stage of International Application No. PCT/CN2018/125071 filed on Dec. 28, 2018, the disclosure of which is hereby incorporated by reference in its entirety.

TECHNICAL FIELD

The present disclosure relates to the field of communication technologies, and in particular, to a method and an apparatus for transmitting uplink information, user equipment and a base station.

BACKGROUND

With a gradual evolution of mobile communication network to a 5G NR (New Radio) system, using only licensed spectrums cannot meet service requirements. Therefore, deployment on unlicensed spectrums, such as a 2.4 GHz frequency band, a 5 GHz frequency band, and the like, has been taken into consideration. This method of using a 5G NR technology on unlicensed spectrums is referred to as a NR Unlicensed (NR-U) technology.

Since the mobile communication system generally competes with other systems such as Bluetooth and Wi-Fi for an unlicensed spectrum resource, in order to ensure that different communication systems on the unlicensed spectrum can fairly occupy a channel resource, the mobile communication system generally proposes a controlled use of the unlicensed spectrum resource, for example, the use of an unlicensed spectrum being controlled by a licensed spectrum. For example, a LAA (License Assisted Access) technology of LTE is implemented by scheduling a CC (component carrier) in an unlicensed spectrum. In a conventional LAA system, the maximum bandwidth of a component carrier is 20 MHz, while in the 5G NR system, the bandwidth level of one component carrier may be within 80 MHz to 400 MHz, and the channel detection is generally performed in a unit of 20 MHz. Thus, on one component carrier there can be different frequency domain parts of a frequency resource scheduled for data transmission that require separate channel detection. In this case, when some of the frequency parts fail in the channel detection, it is necessary to clarify how to transmit data with the scheduled resource.

SUMMARY

In order to overcome the problems in the art, examples of the present disclosure provide a method and an apparatus for transmitting uplink information, user equipment and a base station.

According to a first aspect of the examples of the present disclosure, a method of transmitting uplink information is provided. The method is applied to user equipment of a 5G NR system, and the method includes:
obtaining uplink transmission configuration information sent by a base station, wherein the uplink transmission configuration information includes at least: a time-frequency range of target uplink resource, the target uplink resource is uplink transmission resource allocated by the base station to the user equipment in a target bandwidth part of an unlicensed spectrum;
determining channel detection information corresponding to the target uplink resource, wherein the channel detection information includes: information indicating valid resource and information indicating invalid resource, the invalid resource is resource in the target uplink resource which fails in channel detection; and the valid resource is resource in the target uplink resource which succeeds in channel detection; and
when invalid resource exists in the target uplink resource, determining a mode for transmitting the uplink information on available transmission resource according to the channel detection information.

Optionally, determining channel detection information corresponding to the target uplink resource includes:
obtaining channel indication information sent by the base station, and determining the channel detection information corresponding to the target uplink resource, wherein the channel indication information instructs the user equipment to use the resource which succeeds in the channel detection as determined and shared by the base station, for uplink information transmission, and the target uplink resource comprises the resource which succeeds in the channel detection.

Optionally, determining channel detection information corresponding to the target uplink resource includes:
performing idle channel detection per preset channel detection unit within the target bandwidth part to obtain a channel detection result; and
determining channel detection information corresponding to the target uplink resource according to the channel detection result.

Optionally, determining a mode for transmitting the uplink information on available transmission resource according to the channel detection information includes:
determining a resource ratio of the invalid resource or the valid resource to the target uplink resource according to the channel detection information;
comparing the resource ratio with a preset transmission threshold to obtain a comparison result; and
determining a mode for transmitting the uplink information on the available transmission resource according to the comparison result.

Optionally, the resource ratio includes an invalid resource ratio, and the invalid resource ratio represents a resource ratio of the invalid resource to the target uplink resource;
comparing the resource ratio with a preset transmission threshold includes:
determining whether the invalid resource ratio is less than a preset invalid transmission threshold, wherein the preset invalid transmission threshold is a preset transmission threshold related to invalid resource;
determining a mode for transmitting the uplink information on available transmission resource according to the channel detection information includes:
transmitting the uplink information using the valid resource when the invalid resource ratio is less than the preset invalid transmission threshold.

Optionally, the method further includes:
terminating transmission of the uplink information on the target uplink resource when the invalid resource ratio is greater than or equal to the preset invalid transmission threshold.

Optionally, prior to comparing the resource ratio with a preset transmission threshold, the method further includes:
obtaining the preset transmission threshold.

Optionally, the uplink transmission configuration information further includes: a target modulation-coding scheme;
obtaining the preset transmission threshold includes:
determining preset transmission threshold information, wherein the preset transmission threshold information includes: a correspondence relationship between modulation-coding schemes and transmission thresholds; and
searching the preset transmission threshold information for the target modulation-coding scheme to obtain a preset transmission threshold corresponding to the target modulation-coding scheme.

Optionally, determining a mode for transmitting the uplink information on available transmission resource according to the channel detection information includes:
determining supplementary uplink resource according to the target uplink resource; and
transmitting the uplink information using the available transmission resource, wherein the available transmission resource at least includes the supplementary uplink resource.

Optionally, determining supplementary uplink resource according to the target uplink resource includes:
determining the supplementary uplink resource according to the time-frequency range of the target uplink resource; the supplementary uplink resource is not less than the target uplink resource, and the supplementary uplink resource is different from the target uplink resource in time domain and/or frequency domain.

Optionally, determining supplementary uplink resource according to the target uplink resource includes:
determining the supplementary uplink resource according to the information corresponding to the invalid resource;
transmitting the uplink information using available transmission resource includes:
transmitting the uplink information using the valid resource and the supplementary uplink resource.

Optionally, determining supplementary uplink resource according to the target uplink resource includes:
determining supplementary uplink resource according to the target uplink resource based on preset supplementary resource configuration information.

Optionally, the supplementary uplink resource is a resource being the same in the time domain and different in the frequency domain as the target uplink transmission resource.

Optionally, the uplink transmission configuration information further includes: original transmission configuration information used to inform the user equipment of the mode for uplink transmission;
determining a mode for transmitting the uplink information on available transmission resource according to the channel detection information includes:
adjusting uplink transmission parameters according to the channel detection information and the original transmission configuration information; and
transmitting the uplink information using the valid resource based on the adjusted uplink transmission parameters.

Optionally, the original transmission configuration information includes: an original modulation-coding scheme corresponding to the target uplink resource;
adjusting uplink transmission parameters according to the channel detection information and the original transmission configuration information includes:
determining a resource ratio of the invalid resource or the valid resource to the target uplink resource according to the channel detection information;
searching preset coding configuration information according to the resource ratio, and determining a target variation corresponding to the resource ratio, wherein the preset coding configuration information includes: a correspondence relationship between resource ratios and variations in the modulation-coding scheme; and
determining an adjusted modulation-coding scheme according to the original modulation-coding scheme and the target variation.

Optionally, prior to searching preset coding configuration information according to the resource ratio, and determining a target variation corresponding to the resource ratio, the method further includes:
obtaining the preset coding configuration information sent by the base station.

Optionally, the method further includes:
sending actual transmission configuration information to the base station based on the adjusted uplink transmission parameters, so that the base station obtains the uplink information according to the actual transmission configuration information.

According to a second aspect of the examples of the present disclosure, a method of transmitting uplink information is provided. The method is applied to a base station of a 5G NR system, and the method includes:
determining target uplink resource for a target user equipment in a target bandwidth part of an unlicensed spectrum;
determining uplink transmission configuration information according to the target uplink resource;
sending the uplink transmission configuration information to the target user equipment, so that the target user equipment determines channel detection information corresponding to the target uplink resource, and when invalid resource which fails in channel detection exists on the target uplink resource, determines a mode for transmitting uplink information on available transmission resource based on the channel detection information; and
receiving the uplink information on the available transmission resource.

Optionally, the method further includes:
performing an idle channel detection per preset channel detection unit within the target bandwidth part, and determining resource which succeeds in channel detection; and
sending channel indication information to the target user equipment, wherein the channel indication information instructs the user equipment to use the resource which succeeds in the channel detection as determined and shared by the base station, for uplink information transmission.

Optionally, the uplink transmission configuration information includes a target modulation-coding scheme, and the method further includes:
sending preset transmission threshold information to the target user equipment, so that the target user equipment matches the preset transmission threshold information to the target modulation-coding scheme, to obtain a preset transmission threshold corresponding to the target modulation-coding scheme;
wherein the preset transmission threshold information includes: a correspondence relationship between modulation-coding schemes and transmission thresholds.

Optionally, the uplink transmission configuration information includes: an original modulation-coding scheme corresponding to the target uplink resource, and the method further includes:

sending preset coding configuration information to the target user equipment, so that the target user equipment adjusts the original modulation-coding scheme according to the channel detection information and the preset coding configuration information;

wherein the preset coding configuration information includes a correspondence relationship between resource ratios and variations in the modulation-coding scheme.

Optionally, the method further includes:

receiving actual transmission configuration information sent by the target user equipment, wherein the actual transmission configuration information includes: adjusted uplink transmission parameters;

receiving the uplink information on the available transmission resource includes:

receiving the uplink data sent by the target user equipment using the valid resource of the target uplink resource according to the actual transmission configuration information, to obtain the uplink information, wherein the valid resource is resource in the target uplink resource which succeeds in channel detection.

According to a third aspect of the examples of the present disclosure, an apparatus for transmitting uplink information is provided. The apparatus is provided in user equipment of a 5G NR system, and the apparatus includes:

an information obtaining module configured to obtain uplink transmission configuration information sent by a base station, wherein the uplink transmission configuration information includes at least: a time-frequency range of target uplink resource, the target uplink resource is uplink transmission resource allocated by the base station to the user equipment in a target bandwidth part of an unlicensed spectrum;

a resource information determining module configured to determine channel detection information corresponding to the target uplink resource, wherein the channel detection information includes: information indicating valid resource and information indicating invalid resource, the invalid resource is resource in the target uplink resource which fails in channel detection; and the valid resource is resource in the target uplink resource which succeeds in channel detection; and an uplink transmission module configured to, when invalid resource exists in the target uplink resource, determine a mode for transmitting the uplink information on available transmission resource according to the channel detection information.

Optionally, the resource information determining module is configured to obtain channel indication information sent by the base station, and determining the channel detection information corresponding to the target uplink resource, wherein the channel indication information instructs the user equipment to use the resource which succeeds in the channel detection as determined and shared by the base station, for uplink information transmission, and the target uplink resource comprises the resource which succeeds in the channel detection.

Optionally, the resource information determining module includes:

a channel detection sub-module configured to perform idle channel detection per preset channel detection unit within the target bandwidth part to obtain a channel detection result; and a resource information determining submodule configured to determine channel detection information corresponding to the target uplink resource according to the channel detection result.

Optionally, the uplink transmission module includes:

a resource ratio determining submodule configured to determine a resource ratio of the invalid resource or the valid resource to the target uplink resource according to the channel detection information;

a comparison submodule configured to compare the resource ratio with a preset transmission threshold to obtain a comparison result; and a first transmission submodule configured to determine a mode for transmitting the uplink information on the available transmission resource according to the comparison result.

Optionally, the resource ratio includes an invalid resource ratio, and the invalid resource ratio represents a resource ratio of the invalid resource to the target uplink resource;

the comparison sub-module is configured to determine whether the invalid resource ratio is less than a preset invalid transmission threshold, wherein the preset invalid transmission threshold is a preset transmission threshold related to invalid resource;

the first transmission submodule is configured to transmit the uplink information using the valid resource when the invalid resource ratio is less than the preset invalid transmission threshold.

Optionally, the apparatus further includes:

a resource terminating module configured to terminate transmission of the uplink information on the target uplink resource when the invalid resource ratio is greater than or equal to the preset invalid transmission threshold.

Optionally, the uplink transmission module further includes:

a threshold obtaining sub-module configured to obtain the preset transmission threshold.

Optionally, the uplink transmission configuration information further includes: a target modulation-coding scheme; the threshold obtaining sub-module includes:

a threshold information determining unit configured to determine preset transmission threshold information, wherein the preset transmission threshold information includes: a correspondence relationship between modulation-coding schemes and transmission thresholds; and a threshold determining unit configured to search the preset transmission threshold information for the target modulation-coding scheme to obtain a preset transmission threshold corresponding to the target modulation-coding scheme.

Optionally, the uplink transmission module includes:

a supplementary resource determining submodule configured to determine supplementary uplink resource according to the target uplink resource; and a second transmission submodule configured to transmit the uplink information using the available transmission resource, wherein the available transmission resource at least includes the supplementary uplink resource.

Optionally, the supplementary resource determining submodule is configured to determine the supplementary uplink resource according to the time-frequency range of the target uplink resource; the supplementary uplink resource is not less than the target uplink resource, and the supplementary uplink resource is different from the target uplink resource in time domain and/or frequency domain.

Optionally, the supplementary resource determining submodule is configured to determine the supplementary uplink resource according to the information corresponding to the invalid resource;

the second transmission submodule is configured to transmit the uplink information using the valid resource and the supplementary uplink resource.

Optionally, the supplementary resource determining submodule is configured to determine supplementary uplink resource according to the target uplink resource based on preset supplementary resource configuration information.

Optionally, the supplementary uplink resource is a resource being the same in the time domain and different in the frequency domain as the target uplink transmission resource.

Optionally, the uplink transmission configuration information further includes: original transmission configuration information configured to inform the user equipment of the mode for uplink transmission;

the uplink transmission module includes:
a parameter adjustment submodule configured to adjust uplink transmission parameters according to the channel detection information and the original transmission configuration information; and
a third transmission submodule configured to transmit the uplink information using the valid resource based on the adjusted uplink transmission parameters.

Optionally, the original transmission configuration information includes: an original modulation-coding scheme corresponding to the target uplink resource;

the parameter adjustment submodule includes:
a resource ratio determining unit configured to determine a resource ratio of the invalid resource or the valid resource to the target uplink resource according to the channel detection information;
a variation determining unit configured to search preset coding configuration information according to the resource ratio, and determine a target variation corresponding to the resource ratio, wherein the preset coding configuration information includes: a correspondence relationship between resource ratios and variations in the modulation-coding scheme; and
a parameter adjustment unit configured to determine an adjusted modulation-coding scheme according to the original modulation-coding scheme and the target variation.

Optionally, the parameter adjustment submodule further includes:
a configuration information obtaining unit configured to obtain the preset coding configuration information sent by the base station.

Optionally, the uplink transmission module further includes:
a transmission parameter sending submodule configured to send actual transmission configuration information to the base station based on the adjusted uplink transmission parameters, so that the base station obtains the uplink information according to the actual transmission configuration information.

According to a fourth aspect of the examples of the present disclosure, an apparatus for transmitting uplink information is provided. The apparatus is applied to a base station of a 5G NR system, and the apparatus including:

a resource determining module configured to determine target uplink resource for a target user equipment in a target bandwidth part of an unlicensed spectrum;
an information configuration module configured to determine uplink transmission configuration information according to the target uplink resource;
an information sending module configured to send the uplink transmission configuration information to the target user equipment, so that the target user equipment determines channel detection information corresponding to the target uplink resource, and when invalid resource which fails in channel detection exists on the target uplink resource, determines a mode for transmitting uplink information on available transmission resource based on the channel detection information; and
an information receiving module configured to receive the uplink information on the available transmission resource.

Optionally, the apparatus further includes:
a channel detection module configured to perform an idle channel detection per preset channel detection unit within the target bandwidth part, and determine resource which succeeds in channel detection; and
an indication information sending module configured to send channel indication information to the target user equipment, wherein the channel indication information instructs the user equipment to use the resource which succeeds in the channel detection as determined and shared by the base station, for uplink information transmission.

Optionally, the uplink transmission configuration information includes: a target modulation-coding scheme, and the apparatus further includes:
a threshold information sending module configured to send preset transmission threshold information to the target user equipment, so that the target user equipment matches the preset transmission threshold information to the target modulation-coding scheme, to obtain a preset transmission threshold corresponding to the target modulation-coding scheme;
wherein the preset transmission threshold information includes a correspondence relationship between modulation-coding schemes and transmission thresholds.

Optionally, the uplink transmission configuration information includes: an original modulation-coding scheme corresponding to the target uplink resource, and the apparatus further includes:
a preset configuration information sending module configured to send preset coding configuration information to the target user equipment, so that the target user equipment adjusts the original modulation-coding scheme according to the channel detection information and the preset coding configuration information,
wherein the preset coding configuration information includes a correspondence relationship between resource ratios and variations in the modulation-coding scheme.

Optionally, the apparatus further includes:
a transmission parameter receiving module configured to receive actual transmission configuration information sent by the target user equipment, wherein the actual transmission configuration information includes adjusted uplink transmission parameters;
wherein the information receiving module is configured to receive the uplink data sent by the target user equipment using the valid resource of the target uplink resource according to the actual transmission configuration information, to obtain the uplink information, and the valid resource is resource in the target uplink resource which succeeds in channel detection.

According to a fifth aspect of the examples of the present disclosure, a non-transitory computer-readable storage medium is provided. The non-transitory computer-readable storage medium have computer instructions stored thereon, wherein when the instructions are executed by a processor, the steps of any of the methods in the first aspect are implemented.

According to a sixth aspect of the examples of the present disclosure, a non-transitory computer-readable storage medium is provided. The non-transitory computer-readable storage medium have computer instructions stored thereon, wherein when the instructions are executed by a processor, the steps of any of the methods in the second aspect are implemented.

According to a seventh aspect of the examples of the present disclosure, user equipment is provided, including:
a processor; and
memory for storing processor executable instructions;
wherein the processor is configured to:
obtain uplink transmission configuration information sent by a base station, wherein the uplink transmission configuration information includes at least: a time-frequency range of target uplink resource, the target uplink resource is uplink transmission resource allocated by the base station to the user equipment in a target bandwidth part of an unlicensed spectrum;
determine channel detection information corresponding to the target uplink resource, wherein the channel detection information includes: information indicating valid resource and information indicating invalid resource, the invalid resource is resource in the target uplink resource which fails in channel detection; and the valid resource is resource in the target uplink resource which succeeds in channel detection; and
when invalid resource exists in the target uplink resource, determine a mode for transmitting the uplink information on available transmission resource according to the channel detection information.

According to an eighth aspect of the examples of the present disclosure, a base station is provided, including:
a processor; and
memory for storing processor executable instructions;
wherein the processor is configured to:
determine target uplink resource for a target user equipment in a target bandwidth part of an unlicensed spectrum;
determine uplink transmission configuration information according to the target uplink resource;
send the uplink transmission configuration information to the target user equipment, so that the target user equipment determines channel detection information corresponding to the target uplink resource, and when invalid resource which fails in channel detection exists on the target uplink resource, determines a mode for transmitting uplink information on available transmission resource based on the channel detection information; and
receive the uplink information on the available transmission resource.

The technical solutions provided by the examples of the present disclosure can include the following beneficial effects:

with the method of transmitting uplink information provided by the present disclosure, user equipment can determine target uplink resource configured by a base station in a target bandwidth part of an unlicensed spectrum according to uplink transmission configuration information sent by the base station; determine channel detection information corresponding to the target uplink resource according to a channel detection result; and when the channel detection information indicates that the target uplink resource includes invalid resource that fails in channel detection, the user equipment can transmit uplink information with available transmission resource according to a preset policy. It can properly avoid affection on transmitting uplink information with scheduled resource having unlicensed frequency channel occupancy uncertainty, and improve effective utilization of unlicensed spectrum resource in the 5G NR system and the reliability of uplink information transmission.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
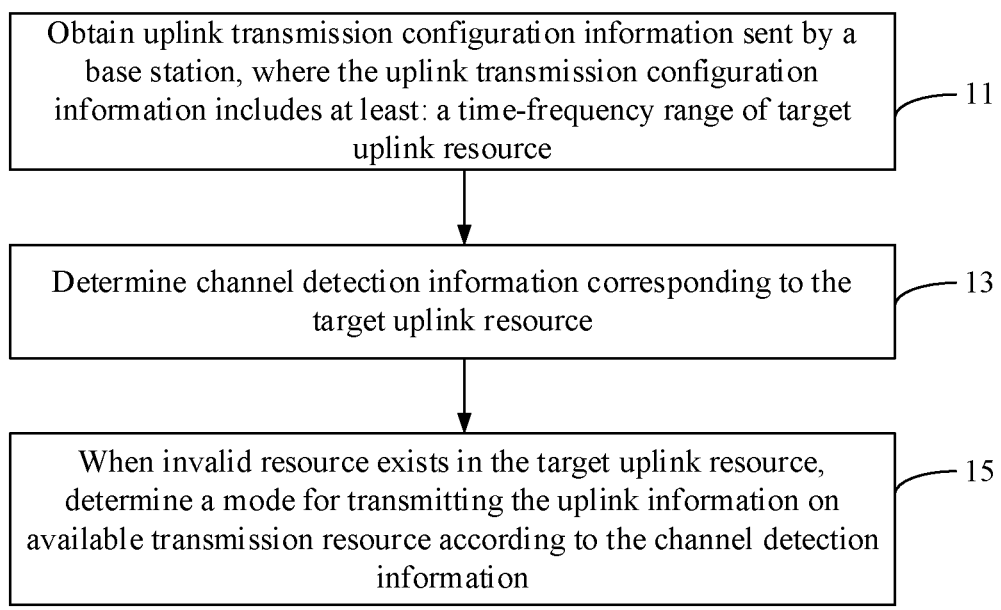
FIG. 1 is a flowchart illustrating a method of transmitting uplink information according to an example of the present disclosure.

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present disclosure to describe various information, such information should not be limited to these terms. These terms are only used to distinguish one category of information from another. For example, without departing from the scope of the present disclosure, first information can be referred as second information; and similarly, second information can also be referred as first information. Depending on the context, the word "if" as used herein can be interpreted as "when" or "upon" or "in response to determining".

In the present disclosure, the entity for performing the method includes: a base station or a UE (User Equipment) of a 5G NR system supporting NR-U technology. The base station can be a base station or a sub-base station provided with a large-scale antenna array. The user equipment can be a user terminal, a user node, a mobile terminal or a tablet computer, or the like. In an implementation, the base station and the user equipment are independent of each other, and the base station and the user equipment are connected to each other to jointly implement the technical solutions provided by the present disclosure. The 5G NR system supporting NR-U technology can include: an LTE-NR interworking system, a 5G NR system, an independently deployed NR-U system, or the like.

Before the technical solution of the present disclosure is described, a brief description the NR-U technology will be given as follows. The NR-U technology is applicable to a high frequency range from 3.3 GHz to 24 GHz, which covers unlicensed spectrums such as 2.4 GHz, 3.5 GHz, 5 GHz, and 6 GHz.

In a 5G NR system, a single frequency band may have a bandwidth close to 1 GHz, and a single carrier may have a bandwidth level between 80 MHz and 400 MHz. For saving energy for a UE (User Equipment), a single carrier can be divided into multiple BWPs (Band Width Parts). The base station can schedule the UE to use one or more BWPs.

An application scenario of the present disclosure is: the base station can configure, for to-be-transmitted uplink information, an uplink transmission resource for a UE in an unlicensed spectrum.

Based on this, the present disclosure provides a method of transmitting uplink information, which is applied to user equipment of a 5G NR system. Referring to a flowchart illustrating a method of transmitting uplink information according to an example in FIG. 1, the method can include the following steps 11-15.

At step 11, uplink transmission configuration information sent by a base station is obtained, where the uplink transmission configuration information includes at least: a time-frequency range of a target uplink resource which is an uplink transmission resource allocated by the base station to the user equipment in a target bandwidth part of an unlicensed spectrum.

In an example of the present disclosure, the uplink transmission configuration information can be sent to the UE in advance by the base station. For example, in a case where the base station can configure periodic unlicensed uplink transmission resource for the UE in an unlicensed spectrum, the base station can send the periodic uplink resource information corresponding to the unlicensed spectrum indicated by the uplink transmission configuration information to the UE in advance. For example, when the UE accesses a cell served by the base station, the uplink resource information can be sent. In this way, the UE can determine the target uplink resource based on the uplink transmission configuration information when the UE needs to transmit uplink information without requesting the base station to configure the target uplink resource in real time.

In another example of the present disclosure, the base station can also configure the target uplink resource in real time based on an uplink transmission demand of the UE, and generate uplink transmission configuration information to send to the UE. The uplink transmission configuration information can be carried in downlink scheduling information sent by the base station to terminals.

Taking the user equipment as UE1 that supports operation in an unlicensed spectrum as an example, when UE1 has uplink information to be transmitted, according to related technologies, the base station has to schedule uplink transmission resource to the UE. In the present disclosure, the base station can schedule uplink transmission resource, that is, the target uplink resource, to the UE based on the unlicensed spectrum supporting capability information corresponding to UE1, such as an operating frequency range supported in the unlicensed spectrum, to allocate uplink resource to UE1 in a target bandwidth part of the unlicensed spectrum. For example, on a target bandwidth part, e.g., BWP1, with a bandwidth of 80 MHz and a frequency range of 5000 MHz-5080 MHz configured by the base station for terminals, a target uplink resource, e.g., U0, with a bandwidth of 60 MHz and a frequency range of 5010 MHz-5070 MHz is configured for UE1, as shown in the schematic diagram of an application scenario for transmitting uplink information according to an example in FIG. 2.

In an example of the present disclosure, the base station can also configure uplink parameters for UE1, such as MCS (Modulation-coding Scheme), reference signal configuration, and other information.

The base station generates uplink transmission configuration information for UE1 according to the above information, and sends the uplink transmission configuration information to UE1.

At step 13, channel detection information corresponding to the target uplink resource is determined, where the channel detection information includes: information indicating a valid resource and information indicating an invalid resource.

The invalid resource is a resource in the target uplink resource which fails in the channel detection; and the valid resource is a resource in the target uplink resource which succeeds in the channel detection.

In the present disclosure, after the UE determines a time-frequency range of the target uplink resource according to the uplink transmission configuration information, the UE can obtain channel detection information in at least two approaches as follows.

Approach 1: The UE determines the channel detection information corresponding to the target uplink resource according to channel indication information sent by the base station.

The channel indication information is configured to instruct the user equipment to use the resource which succeeds in channel detection as determined and shared by the base station, for uplink information transmission. The target uplink resource includes the resource which succeeds in channel detection.

In an example of the present disclosure, after sending the uplink transmission configuration information to UE1, the base station can perform an idle channel detection such as an LBT (listen before talk) detection on the frequency range where the target uplink resource is located. After the resource which succeeds in the channel detection is determined, the UE1 is notified to use the shared resource which succeeds in the channel detection for uplink information transmission. The resource which succeeds in channel detection belongs to part of the target uplink resource or the complete target uplink resource.

Approach 2: The idle channel detection is performed per preset channel detection unit within the target bandwidth part to obtain channel detection information.

In the second approach, the step 13 can include:
performing the idle channel detection per preset channel detection unit within the target bandwidth part to obtain a channel detection result; and determining channel detection information corresponding to the target uplink resource according to the channel detection result.

As in the above example, UE1 can perform the idle channel detection on the target bandwidth part per channel detection unit agreed by the system or notified by the base station, such as 20 MHz, to obtain the channel detection result.

After obtaining the channel detection result, UE1 can determine the channel detection information corresponding to the target uplink resource according to the channel detection result. That is, it is determined whether the target uplink resource includes an invalid resource, an amount of resources contained in the invalid resource, and other information.

Still taking the target bandwidth part of 80 MHz as an example, UE1 can perform the idle channel detection in the target bandwidth part with 20 MHz as a channel detection unit, and determine which channel detection units fail in the channel detection and which channel detection units succeed in the channel detection. Then UE1 can compare the frequency ranges corresponding to the channel detection units which succeed or fail in the channel detection with the frequency range of the target uplink resource, to determine frequency ranges of the invalid resource and the valid resource in the target uplink resource.

Figure 2:
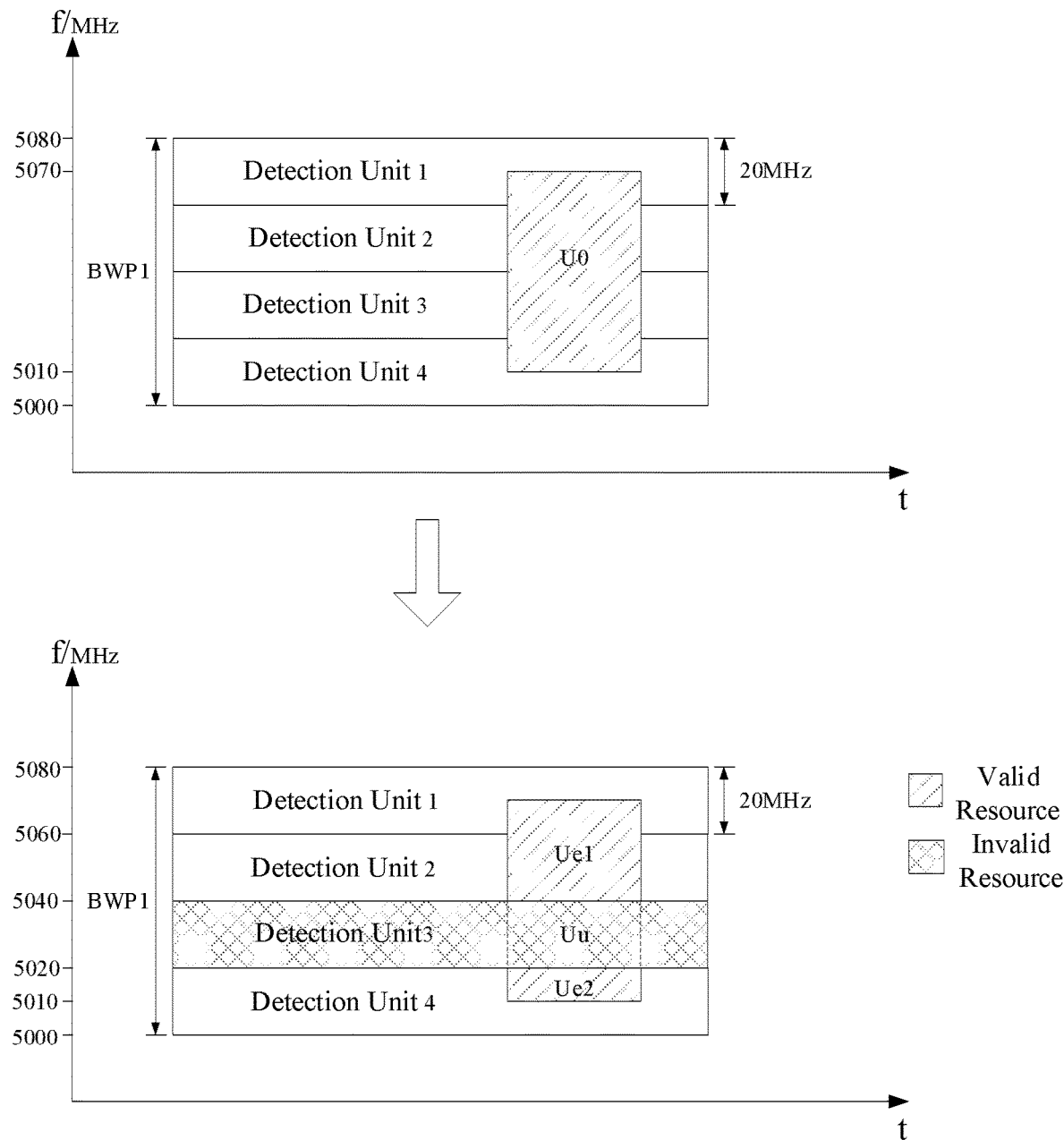
FIG. 2 is a schematic diagram illustrating an application scenario for transmitting uplink information according to an example of the present disclosure.

As shown in FIG. 2, the resource corresponding to the target bandwidth part BWP1, can be divided into 4 channel detection units, which are sequentially denoted: detection unit 1 to detection unit 4. The frequency range corresponding to each of the channel detection units in the target bandwidth part can be as shown in the following Table 1:

TABLE 1

| Channel detection unit identification | Corresponding frequency range |
|---|---|
| Detection unit 1 | 5060 MHz-5080 MHz |
| Detection unit 2 | 5040 MHz-5060 MHz |
| Detection unit 3 | 5020 MHz-5040 MHz |
| Detection unit 4 | 5000 MHz-5020 MHz |

Assuming that after UE1 performs the idle channel detection, the channel detection result obtained is: detection unit 3 fails the channel detection, that is, the frequency range of 5020 MHz to 5040 MHz fails in the channel detection. Then the channel detection information corresponding to the target uplink resource determined by UE1 according to the channel detection result can be represented by: the frequency ranges of valid resource Ue in the target uplink resource U0 include: 5010 MHz-5020 MHz, 5040 MHz-5070 MHz; the frequency range of invalid resource Uu includes: 5020 MHz-5040 MHz.

At step 15, when an invalid resource exists in the target uplink resource, a mode for transmitting the uplink information on an available transmission resource is determined according to the channel detection information.

In the present disclosure, when the UE determines that there is an invalid resource in the target uplink resource that fails in the channel detection, the UE can determine an available transmission resource based on the channel detection information, and determine a mode for transmitting the uplink information on the available transmission resource. The available resource includes: the valid resource and/or other resources, which will be described in detail in combination with different implementations of step 15 later.

Accordingly, with the method of transmitting uplink information provided by the present disclosure, user equipment can determine target uplink resource configured by a base station in a target bandwidth part of an unlicensed spectrum according to uplink transmission configuration information sent by the base station; determine channel detection information corresponding to the target uplink resource according to a channel detection result; and when the channel detection information indicates that the target uplink resource includes the invalid resource that fails in the channel detection, the user equipment can transmit uplink information with the available transmission resource according to a preset policy. As a result. affection on transmitting uplink information with scheduled resource having unlicensed frequency channel occupancy uncertainty can be properly avoided, and effective utilization of unlicensed spectrum resource in the 5G NR system and the reliability of uplink information transmission can be improved.

In the present disclosure, the UE can perform step 15 in at least three implementations as follows.

In the first implementation, the UE determines how to transmit the uplink information according to a ratio of the invalid resource or the valid resource to the target uplink resource.

In the present disclosure, the UE can determine to perform step 15 according to the first implementation according to an agreement of the system protocol, or according to preset indication information sent by the base station through preset signaling.

Figure 3:
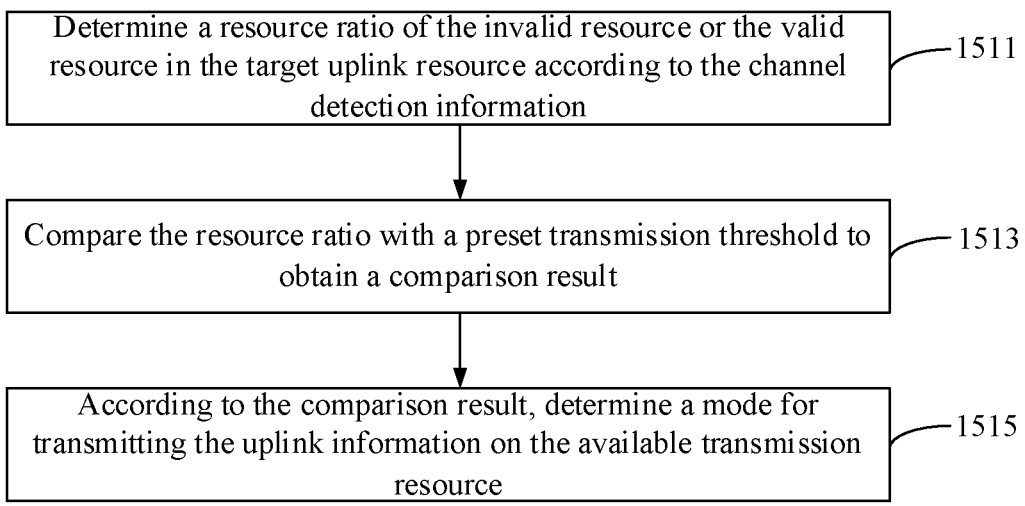
FIG. 3 is a flowchart illustrating another method of transmitting uplink information according to an example of the present disclosure.

Referring to the flowchart illustrating another method of transmitting uplink information according to an example in FIG. 3, step 15 can include the following steps 1511-1515.

At step 1511, a resource ratio of the invalid resource or the valid resource to the target uplink resource is determined according to the channel detection information.

In the present disclosure, after the invalid resource and the valid resource is determined, the UE can determine any of the following resource ratios:
 an invalid resource ratio Ru, representing a resource ratio of the invalid resource to the target uplink resource;
 a valid resource ratio Re, representing a resource ratio of the valid resource in the target uplink resource.

Regarding the calculation method of the resource ratios, taking the invalid resource ratio Ru as an example, in an embodiment, the Ru can be determined by calculating a ratio of the frequency ranges of the invalid resource to the frequency range of the target uplink resource. As shown in FIG. 2, Ru=Uu/U0=1/3. In the same way, the valid resource ratio is Re=Ue/U0=2/3, where Ue includes: Ue1 and Ue2.

At step 1513, the resource ratio is compared with a preset transmission threshold to obtain a comparison result.

In the present disclosure, after determining the resource ratio, the UE can compare the resource ratio with a preset transmission threshold, so that subsequently it can be determined how to transmit uplink information according to the comparison result.

It can be understood that, in general, depending on different types of resource ratios, the values of the preset transmission thresholds are also different.

Regarding how to determine the preset transmission threshold, the following two cases can be considered.

Case 1: The preset transmission threshold can be a fixed value agreed by the system. For example, factory settings of the UE include the preset transmission threshold. Alternatively, when the UE accesses a cell served by the base station, the UE obtains the preset transmission threshold according to system information broadcast by the base station.

Case 2: The preset transmission threshold is dynamically changed according to the uplink transmission information configured by the base station, such as the MCS.

Figure 4:
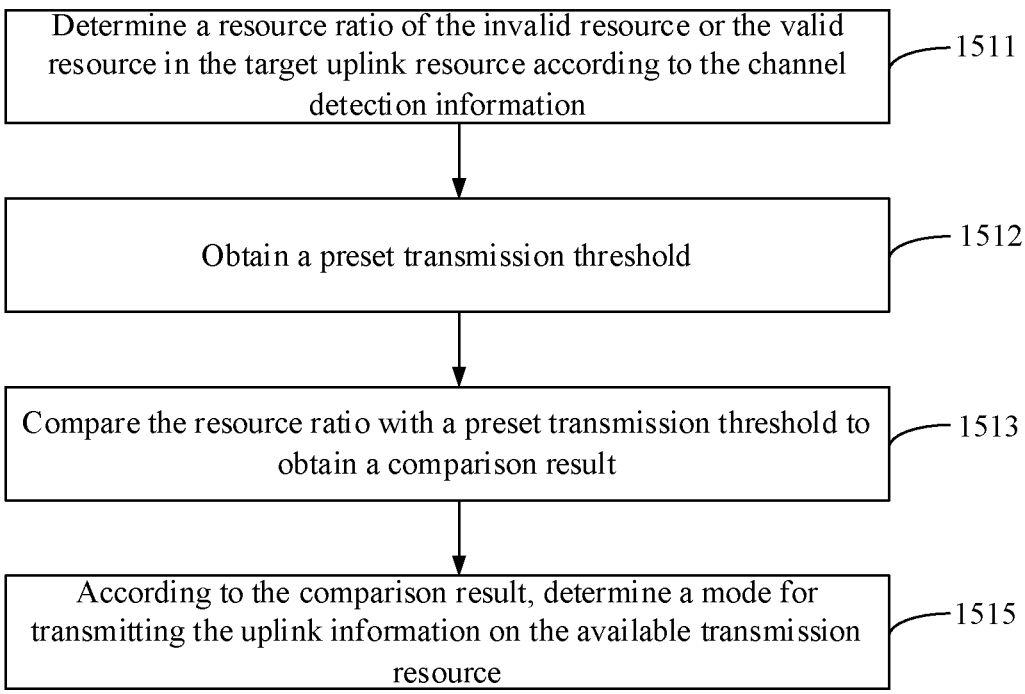
FIG. 4 is a flowchart illustrating another method of transmitting uplink information according to an example of the present disclosure.

Corresponding to Case 2, referring to the flowchart illustrating another method of transmitting uplink information according to an example in FIG. 4, prior to step 1513, step 15 can further include the following step.

At step 1512, a preset transmission threshold is obtained.

Figure 5:
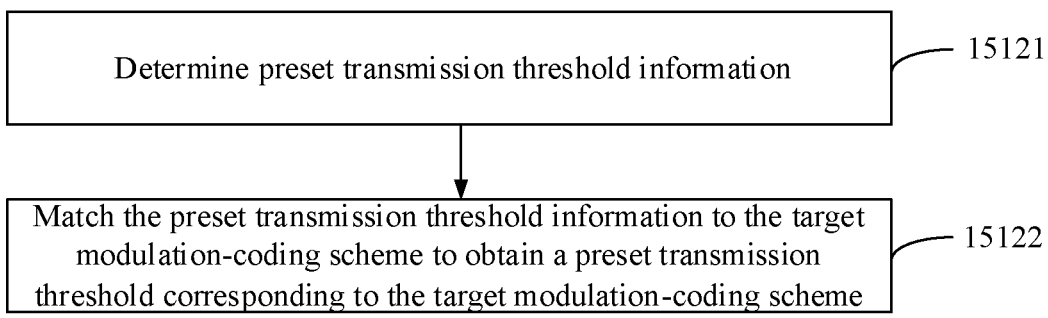
FIG. 5 is a flowchart illustrating another method of transmitting uplink information according to an example of the present disclosure.

In an example of the present disclosure, if the preset transmission threshold is dynamically changed along with MCS information, referring to the flowchart illustrating another method of transmitting uplink information according to an example in FIG. 5, step 1512 can include the following step.

At step 15121, preset transmission threshold information is determined, where the preset transmission threshold information includes: a correspondence relationship between modulation-coding scheme and transmission threshold.

In the present disclosure, the preset transmission threshold information can also be pre-agreed by the system protocol, or dynamically configured by the base station according to information on a current service cell information. For example, the current service cell information can include: information such as a number of devices capable of supporting unlicensed spectrums in the current service cell, and an amount of traffic carried by unlicensed spectrums.

Corresponding to the dynamic configuration, step 15121 can include: receiving preset transmission threshold information issued by the base station, where the preset transmission threshold information is configured to indicate a correspondence relationship between preset uplink transmission parameter and transmission threshold.

The base station can use upper layer signaling or physical layer signaling to send the preset transmission threshold information to the UE. The upper layer signaling can be RRC (Radio Resource Control) signaling, MAC (Medium Access Control) and CE (Control Element) signaling.

At step 15122, the preset transmission threshold information is matched to the target modulation-coding scheme to obtain a preset transmission threshold corresponding to the target modulation-coding scheme.

Assuming that the transmission threshold is a transmission threshold related to a valid resource, the correspondence relationship between the modulation-coding scheme and the transmission threshold indicated by the preset transmission threshold information can be as shown in Table 2.

TABLE 2

| MCS | Transmission threshold |
|---|---|
| BPSK | R10 |
| QPSK | R20 |
| 16QAM | R30 |
| 64QAM | R40 |

If the uplink modulation-coding scheme currently configured by the base station for UE1 is QPSK, it can be known from the above Table 2 that the corresponding preset transmission threshold is R20. Subsequently, UE1 can perform step 1513 according to the preset threshold.

At step 1515, according to the comparison result, a mode for transmitting the uplink information on the available transmission resource is determined.

The following will take the comparison of invalid resource ratio and a preset transmission threshold as an example to describe the first implementation in detail.

Figure 6:
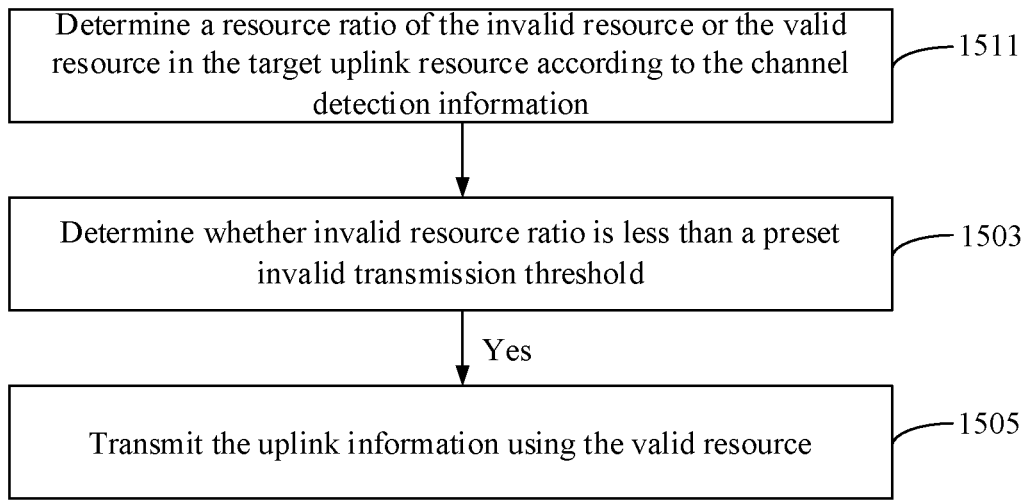
FIG. 6 is a flowchart illustrating another method of transmitting uplink information according to an example of the present disclosure.

Referring to the flowchart illustrating another method of transmitting uplink information according to an example in FIG. 6, the step 1513 can be specifically step 1503, and the step 1515 can specifically be step 1505, then the step 15 can include:

At step 1503, it is determined whether the invalid resource ratio is less than a preset invalid transmission threshold.

The invalid transmission threshold can be a preset transmission threshold related to an invalid resource determined by the UE at step 1512.

At step 1505, if the invalid resource ratio is less than the preset invalid transmission threshold, the uplink information is transmitted using the valid resource.

As an example, assuming that the preset invalid transmission threshold is 50%, in an example of the present disclosure, UE1 can compare the Ru with the preset invalid transmission threshold, and if Ru is less than 50%, UE1 determines to transmit the uplink information using the valid resource in the target uplink resource. Otherwise, the following step 1506 can be performed.

In the application scenario shown in FIG. 2, Ru=1/3, which is less than 50%; then UE1 can transmit the uplink information on the valid resources corresponding to 5010 MHz-5039 MHz and 5059 MHz-5070 MHz.

Figure 7:
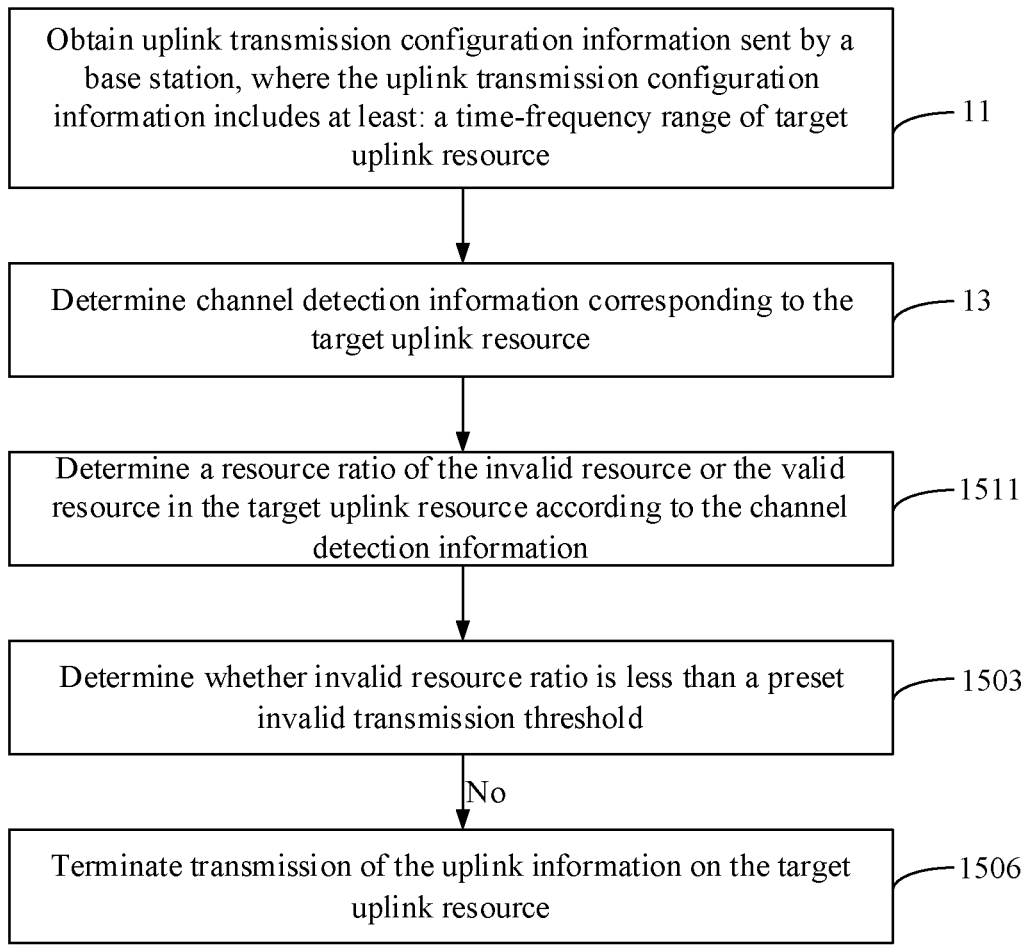
FIG. 7 is a flowchart illustrating another method of transmitting uplink information according to an example of the present disclosure.

Referring to a flowchart illustrating another method of transmitting uplink information according to an example in FIG. 7, after the above step 1503, the method can further include the following step 1506.

At step 1506, if the invalid resource ratio is greater than or equal to the preset invalid transmission threshold, transmission of the uplink information on the target uplink resource is terminated.

As still in the above example, if Ru is greater than 50%, UE1 can determine to terminate transmission of the uplink information corresponding to the target uplink resource.

In the examples of the present disclosure, when the UE determines that there are more resources in the target uplink resource that fail in the channel detection, it is determined that the availability of the target uplink resource scheduled by the base station is low, and the transmission of the uplink information on the target uplink resource can be terminated.

Based on the same reason, the UE can also compare the valid resource ratio with the corresponding preset transmission threshold to determine whether the valid resource in the target uplink resource can be used to transmit uplink information. For specific implementations, referring to FIG. 6 and FIG. 7 above. The illustrated example will not be repeated here.

In an example of the first implementation of the present disclosure, when the UE determines that there are fewer resources in the target uplink resource that fail in the channel detection, the UE can use the valid resource in the target uplink resource to transmit the uplink information, thereby avoiding waste of resource caused by the uncertainty of channel occupancy of unlicensed spectrums, improving the effective utilization of unlicensed spectrum resource in the 5G NR system.

In the second implementation, when the UE determines that the target uplink includes an invalid resource, a supplementary uplink resource is determined, and the uplink information is transmitted based on the supplementary uplink resource.

Figure 8:
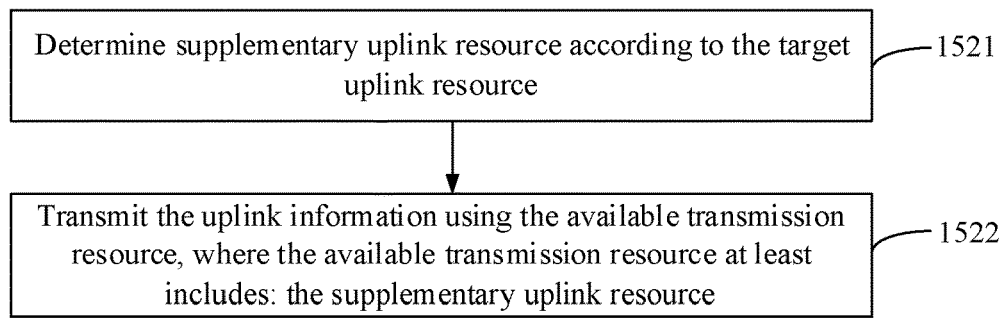
FIG. 8 is a flowchart illustrating a method of transmitting uplink information according to an example of the present disclosure.

Referring to the flowchart illustrating another method of transmitting uplink information according to an example shown in FIG. 8, the step 15 can include the following steps 1521 and 1522.

At step 1521, a supplementary uplink resource is determined according to the target uplink resource.

In the examples of the present disclosure, when the UE determines that there is an invalid resource in the target uplink resource scheduled by the base station which fails in the channel detection, it can obtain a supplementary uplink resource determined in other frequency range and/or time domain for use in transmitting the uplink information.

The other frequency range can be a licensed frequency range; or an unlicensed frequency range, for example, a frequency range besides the frequency range occupied by the target uplink resource in the target bandwidth part, or other frequency range beside s the target bandwidth part.

The approach in which the UE determines the supplementary uplink resource can include the following two implementations.

Implementation 1: The UE can automatically determine the supplementary uplink resource according to a preset supplementary resource configuration information agreed by the system.

The preset supplementary resource configuration information includes at least: preset resource indication information, which is configured to indicate a time-frequency range for the UE to determine the supplementary uplink resource. Correspondingly, the UE can automatically determine the time-frequency range of the supplementary uplink resource according to the preset resource indication information.

In the examples of the present disclosure, the UE can automatically determine the supplementary uplink resource according to the preset supplementary resource configuration information agreed by the system, without requiring the base station to send supplementary resource configuration information to the user equipment through signaling, which can save system signaling overhead.

Implementation 2: The UE can also determine the supplementary uplink resource according to supplementary resource configuration information dynamically issued by the base station.

The supplementary resource configuration information is configured to inform the UE how to determine the supplementary uplink resource, and can include: preset mode indication information, which is configured to instruct the UE to determine the supplementary uplink resource according to the second implementation; and can also include: preset resource indication information, configured to inform the UE in which way to determine the time-frequency range of supplementary uplink resource.

In the examples of the present disclosure, the base station can send dynamically configured supplementary resource configuration information to the user equipment through preset signaling, so that the UE can accurately determine the time-frequency range of the supplementary uplink resource.

Regarding how the UE determines the time-frequency range of the supplementary uplink resource, the step 1521 can include the following implementations.

Implementation 1: the supplementary uplink resource is determined according to the time-frequency range of the target uplink resource;

The supplementary uplink resource is not less than the target uplink transmission resource. That is, the resource amount of the supplementary uplink resource can be greater than or equal to the resource amount of the target uplink resource. Compared with the target uplink resource, the supplementary uplink resource can be the same in the frequency domain and different in the time domain to match the working frequency range of the UE on the unlicensed spectrum; it can also be the same in the time domain and different in the frequency domain, to ensure that the uplink information can be completed within the preset time originally configured by the base station, so as to reduce transmission delay; or, it can be different in both the time domain and frequency domain to ensure the reliability of uplink information transmission.

In the first implementation, when the UE determines that the target uplink resource contains an invalid resource, the UE determines a supplementary uplink resource that can completely replace the target uplink resource, and uses the supplementary uplink resource to transmit the uplink information.

The above implementation 1 can be applied to any application scenario where it is found that the target uplink resource contains an invalid resource, and is especially suitable for the application scenario corresponding to the example in FIG. 7, that is, the target uplink resource contains more invalid resources, which makes the target uplink resource lose the utilization value, the reliable transmission of the uplink information can still be ensured.

Implementation 2: The UE can determine the supplementary uplink resource based on the invalid resource, and remains the valid resource for use.

That is, the UE can determine the supplementary uplink resource according to the time-frequency range of the invalid resource, so that the supplementary uplink resource only replaces the invalid resource in the target supernatural resource for uplink information transmission.

The second implementation mentioned above can be applied to any application scenario where it is found that the target uplink resource contains an invalid resource, and is especially suitable for the application scenario corresponding to the example in FIG. 6, that is, the target uplink resource contains less invalid resources and still has a utilization value. It can avoid wasting valid resource in target uplink resource, and improve the effective utilization of unlicensed spectrum resource.

Similarly, in the example of the present disclosure, compared with the invalid resource, the supplementary uplink resource can include the following cases.

Case 1: Same in the frequency domain but different in the time domain to match the working frequency range of the UE on the unlicensed spectrum.

Case 2: Same in the time domain but different in the frequency domain to ensure that the uplink information can be completed within the preset time originally configured by the base station and reduce the transmission delay.

Case 3: Different in both the time domain and the frequency domain to ensure the reliability of uplink information transmission.

At step 1522, the uplink information is transmitted using the available transmission resource, where the available transmission resource at least includes: the supplementary uplink resource.

Corresponding to the implementation 1, the available transmission resource is a supplementary uplink resource that replaces the target uplink resource as a whole.

Figure 9A:
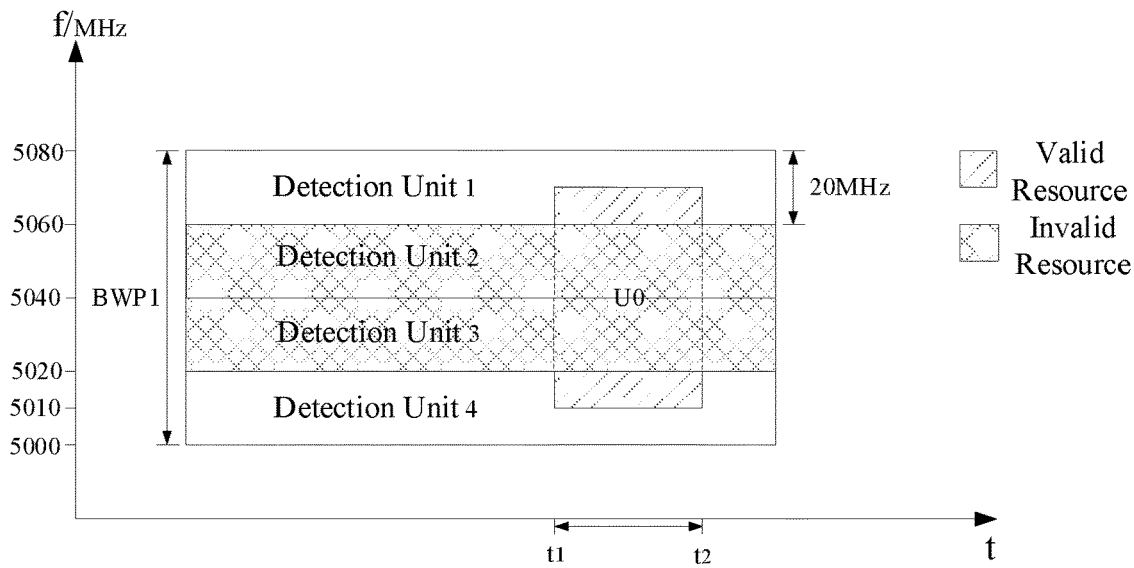
FIG. 9A is a schematic diagram illustrating another application scenario for transmitting uplink information according to an example of the present disclosure.
Figure 9A:
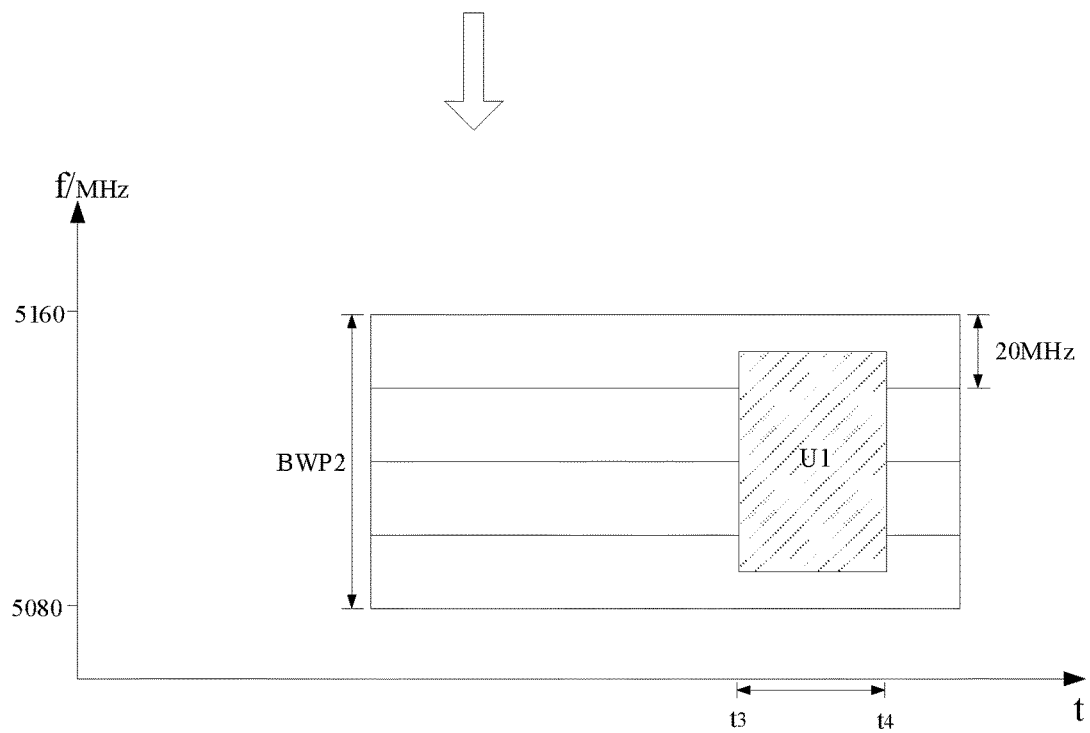

As an example, referring to the schematic diagram of a scenario for transmitting uplink information shown in FIG. 9A according to an example. If the target bandwidth part BWP1, detection units 2 and 3 all fail in the channel detection, since a second invalid resource ratio is greater than the preset transmission threshold, such as 50%, UE1 terminates transmitting uplink information on the target uplink resource U0, and transmits the uplink information on the supplementary uplink resource U1 in another target bandwidth part BWP2 (5080 MHz-5016 MHz). The time domain range of the supplementary uplink resource U1 is (t3, t4). In the above example, the supplementary uplink resource U1 and the target uplink resource U0 have the same resource amount and different time-frequency ranges, which can ensure that the uplink information is transmitted to the base station smoothly.

Corresponding to the second implementation above, the available transmission resource include: the valid resource and a supplementary uplink resource that replaces the invalid resource.

Figure 9B:
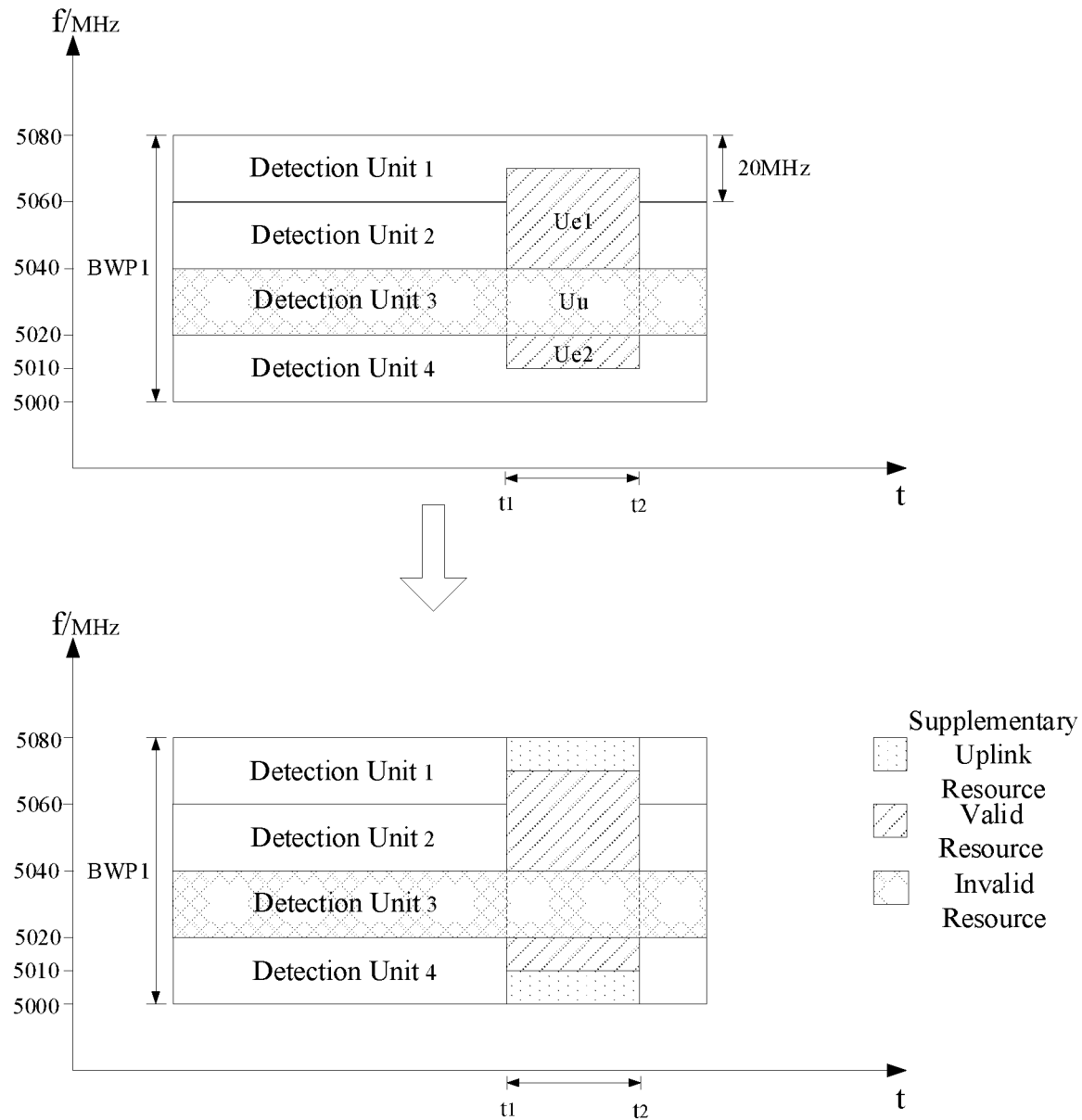
FIG. 9B is a schematic diagram illustrating another application scenario for transmitting uplink information according to an example of the present disclosure.

For example, referring to the schematic diagram of another scenario of transmitting uplink information according to an example shown in FIG. 9B. Since the second invalid resource ratio accounts for 1/3, which is less than the preset transmission threshold such as 50%, UE1 can use the valid resource of the target uplink resource and the supplementary uplink resource determined in the target bandwidth part BWP1 to transmit the uplink information, which can not only avoid resource waste, but also ensure that the uplink information is transmitted to the base station within a preset time and avoid increasing the transmission delay.

In the example corresponding to the second example of the present disclosure, when the UE determines that the target uplink resource contains an invalid resource, the UE can determine to supplement the uplink resource for uplink information transmission, to ensure that the uplink information to be transmitted can be transmitted to the base station, and to improve the reliability in transmission of the uplink information.

In a third implementation, after determining that the target uplink resource includes an invalid resource, the UE adjusts transmission parameters based on the valid resource and the original transmission configuration information for the target uplink resource.

In the example of the present disclosure, the uplink transmission configuration information obtained by the UE at step 11 can also include: original transmission configuration information, which is configured to inform the UE of the mode for uplink transmission, such as the modulation-coding scheme configuration, for the target uplink resource.

Figure 10:
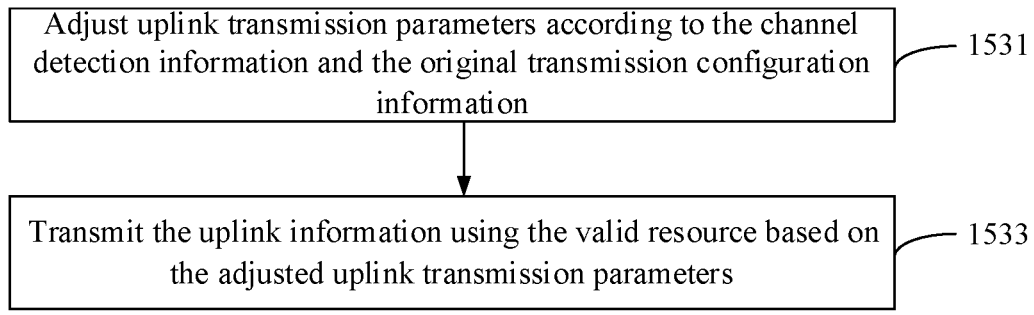
FIG. 10 is a flowchart illustrating another method of transmitting uplink information according to an example of the present disclosure.

Referring to the flowchart illustrating another method of transmitting uplink information according to an example in FIG. 10, the step 15 can include the following steps 1531 and 1532.

At step 1531, uplink transmission parameters are adjusted according to the channel detection information and the original transmission configuration information.

In the examples of the present disclosure, when the base station determines the original transmission configuration information for the target uplink resource, it generally assumes that the target uplink resource satisfies a preset channel condition, for example, it can pass channel detection. According to related knowledge, when the actual channel condition of the target uplink resource does not satisfy the preset channel condition, the matching uplink transmission configuration information should be adjusted adaptively to obtain adjusted uplink transmission parameters corresponding to the actual channel condition, that is, corresponding to the valid resource.

The original transmission configuration information can include: the original modulation-coding scheme corresponding to the target uplink resource, an original uplink transmission power control parameter, and an original multi-antenna transmission mechanism, and the like.

In an example of the present disclosure, taking the original transmission configuration information including the original modulation-coding scheme as an example, in the following, how to adjust the uplink transmission parameters will be described.

Figure 11:
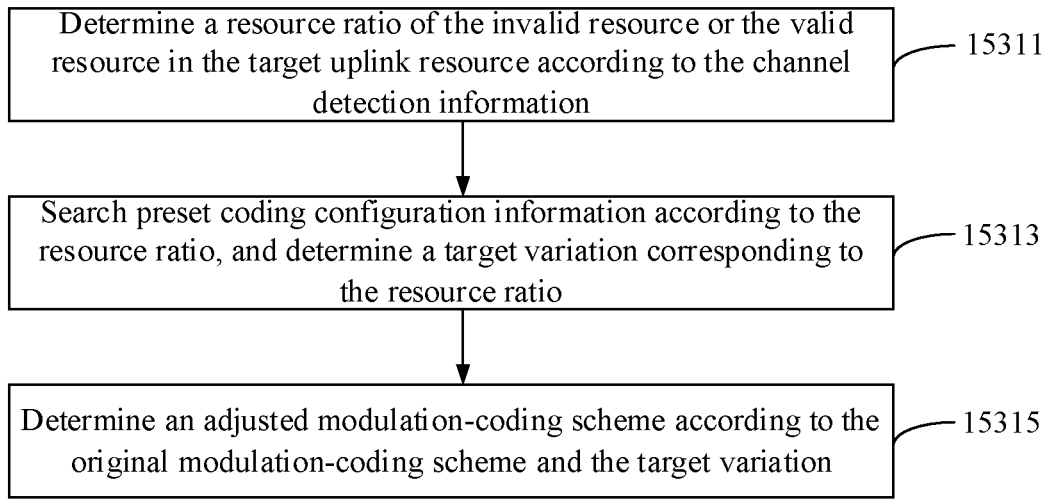
FIG. 11 is a flowchart illustrating another method of transmitting uplink information according to an example of the present disclosure.

Correspondingly, referring to the flowchart illustrating another method of transmitting uplink information according to an example in FIG. 11, the step 1531 can include the following steps 15311-15315.

At step 15311, a resource ratio of the invalid resource or the valid resource to the target uplink resource is determined according to the channel detection information.

In the examples of the present disclosure, the UE can determine the valid resource ratio Re and the invalid resource ratio Ru, so as to adjust the MCS information according to the resource ratio subsequently.

As mentioned above, the invalid resource ratio Ru indicates a resource ratio of the invalid resource to the target uplink resource.

The valid resource ratio Re indicates a resource ratio of the valid resource to the target uplink resource.

At step 15313, preset coding configuration information is quired according to the resource ratio, so as to determine a target variation corresponding to the resource ratio.

The preset coding configuration information includes: a correspondence relationship between resource ratio and variation in MCS.

In the example of the present disclosure, the UE can determine a target variation in MCS corresponding to the resource ratio according to preset coding configuration information.

The preset coding configuration information can be configuration information preset in the UE and agreed upon by the system, or can be dynamically configured by the base station.

In an example of the present disclosure, the preset coding configuration information can include: a correspondence relationship between valid resource ratio Re and MCS variation ΔM. As an example, as shown in Table 3:

TABLE 3

| Re | Δ M |
|---|---|
| 2/3 | +1 |
| 1/2 | +2 |

As shown in Table 3, when the valid resource ratio Re is equal to 2/3, the corresponding ΔM is increased by one level; and so on, when the Re value of UE1 is 1/2, referring to Table 3, the corresponding ΔM is "+2", that is, increase by two levels.

Figure 12:
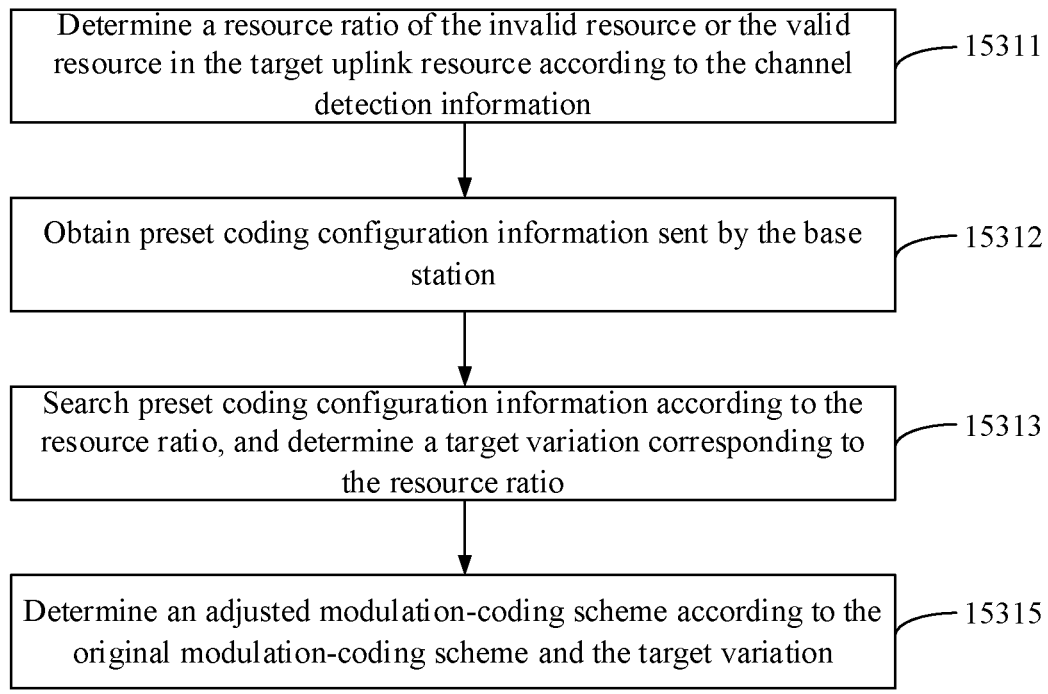
FIG. 12 is a flowchart illustrating a method of transmitting uplink information according to an example of the present disclosure.

In a case that no such preset coding configuration information is stored in the user equipment, and the original modulation-coding scheme does not match the actual valid resource, referring to the flowchart illustrating a method of transmitting uplink information according to an example in FIG. 12, prior to the step 15313, the method also includes the following step 15312.

At step 15312, preset coding configuration information sent by the base station is obtained.

In the example of the present disclosure, the base station can send the preset coding configuration mode to the UE after learning that the target uplink resource includes an invalid resource.

Regarding how the base station learns that the target uplink resource includes an invalid resource, corresponding to Approach 1 of step 13 described above, the base station can learn that the target uplink resource includes an invalid resource after performing the idle channel detection on the target uplink resource.

Corresponding to Approach 2 of step 13 described above, that is, the approach in which the UE performs channel detection, after the UE determines that the target uplink resource includes an invalid resource according to the channel detection result, the UE can inform the base station through preset signaling.

At step 15315, an adjusted modulation-coding scheme is determined according to the original modulation-coding scheme and the target variation.

Following the above example, assuming that the bandwidth of the target uplink resource is 60 MHz, and the modulation and demodulation mode in the original MCS information configured by the base station for UE1 is 16QAM. If the frequency range of the valid resource is 40 MHz, the Re value of UE1 is 2/3, and the corresponding ΔM value is "+1", which means it is increased by one level, and the adjusted modulation and demodulation mode is a modulation mode one level prior to the 16QAM. If the 5G NR system still adopts the MCS definition of the LTE system, the adjusted modulation and demodulation method is 64QAM.

In the present disclosure, if the channel detection information indicates that the amount of the valid resource is decreasing relative to the target uplink resource, the original modulation-coding scheme can be adjusted to a modulation-coding scheme corresponding to higher data transmission efficiency, so that the UE can effectively transmit the uplink data at a higher data transmission rate with the valid resource channel condition being satisfied, thereby making full use of the valid resource and avoid waste of resource.

At step 1533, the uplink information is transmitted using the valid resource based on the adjusted uplink transmission parameters.

Corresponding to the example shown in FIG. 12, the UE can use the adjusted MCS information to transmit the uplink information on the valid resource. As in the above example, the UE1 can use the higher-level modulation and demodulation mode 64QAM to transmit the uplink information on the valid resource, which avoids a waste of resources.

In an example corresponding to the above third implementation, the UE can dynamically adjust the uplink transmission parameters based on the channel detection information corresponding to the target uplink resource, so that the UE can transmit data as quickly as possible with the valid resource channel condition being satisfied, thereby avoiding a waste of resources due to mismatch between uplink transmission configuration information and actual channel conditions, and improving the transmission efficiency of uplink information and the utilization of valid resource on an unlicensed spectrum.

In a case that the UE adjusts the uplink transmission parameters, correspondingly, in an example of the present disclosure, the base station can adaptively adjust and obtain the relevant configuration information corresponding to the uplink data on the target uplink resource.

In another example of the present disclosure, the UE can also inform the base station of the adjusted uplink transmission parameters.

Figure 13:
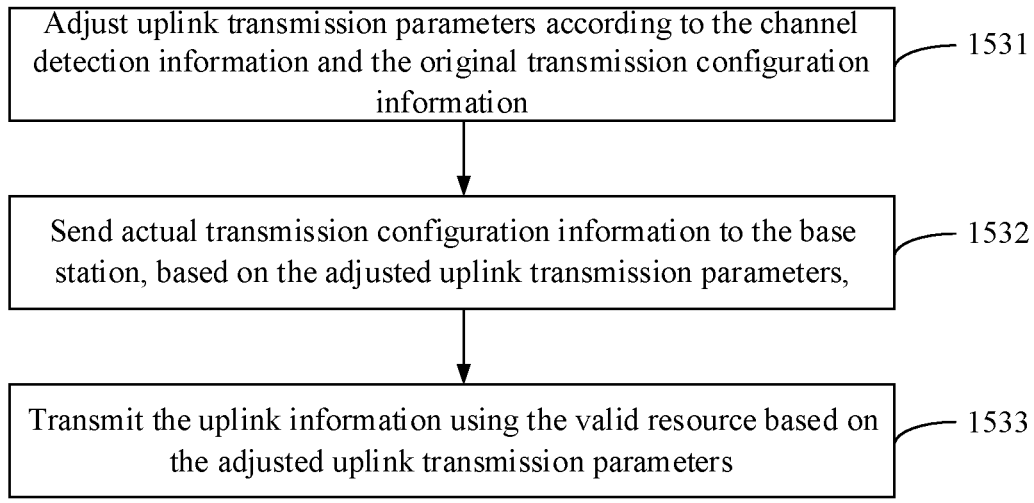
FIG. 13 is a flowchart illustrating another method of transmitting uplink information according to an example of the present disclosure.

Referring to the flowchart illustrating another method of transmitting uplink information in FIG. 13 according to an example, before the step 1533, the method can further include step 1532.

At step 1532, based on the adjusted uplink transmission parameters, actual transmission configuration information is sent to the base station.

In the examples of the present disclosure, after the UE determines the adjusted uplink transmission parameters, the UE can also generate actual transmission configuration information according to the adjusted uplink transmission parameters, and send the actual transmission configuration information to the base station, so that the base station can accurately obtain the uplink information according to the actual transmission configuration information subsequently.

Correspondingly, the present disclosure also provides a method of transmitting uplink information, which is applied to the base station of the 5G NR system.

Figure 14:
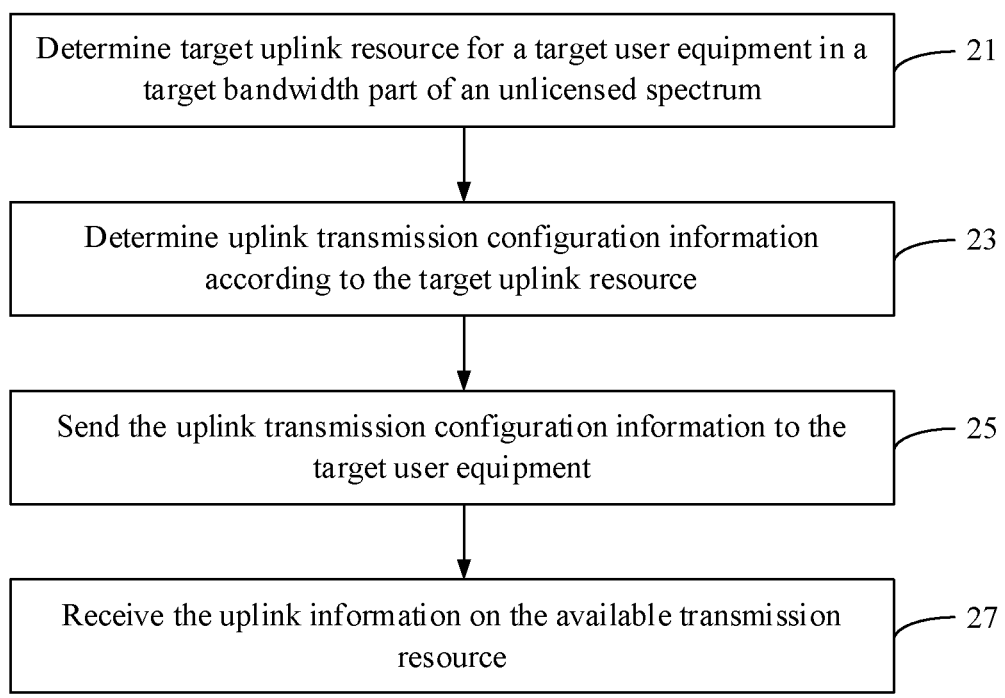
FIG. 14 is a flowchart illustrating a method of transmitting uplink information according to an example of the present disclosure.

Referring to a flowchart illustrating a method of transmitting uplink information according to an example in FIG. 14, the method can include the following steps 21-27:

At step 21, a target uplink resource is determined for a target user equipment in a target bandwidth part of an unlicensed spectrum.

In the present disclosure, when the base station determines that the target UE has uplink information to be transmitted, the base station can configure a target uplink transmission resource for the target UE in a target bandwidth part according to a channel condition of the target UE in an unlicensed spectrum, or the like, which are known in advance.

At step 23, uplink transmission configuration information is determined according to the target uplink resource.

In an example of the present disclosure, after determining the target uplink resource, the base station can also determine corresponding uplink transmission parameters such as MCS information, uplink reference signal configuration, or the like, and generate the uplink transmission configuration information for the target UE based on information related to uplink transmission.

At step 25, the uplink transmission configuration information is sent to the target user equipment, so that the target user equipment determines channel detection information corresponding to the target uplink resource, and when invalid resource exists on the target uplink resource, determines a mode for transmitting uplink information on an available transmission resource based on the channel detection information.

This step corresponds to step 11 above, reference can be made to the description of step 11 above.

In the present disclosure, the base station can use upper layer signaling or physical layer signaling to send the uplink transmission configuration information to the target UE. Here, the upper layer signaling can be RRC signaling or MAC CE signaling.

Corresponding to Approach 1 for the UE to obtain the channel detection result, after the base station sends the uplink transmission configuration information to the target UE, the base station can also perform idle channel detection on the target uplink resource, and based on a resource which succeeds in the channel detection, inform the target UE to transmit uplink information on the resource which succeeds in channel detection.

Figure 15:
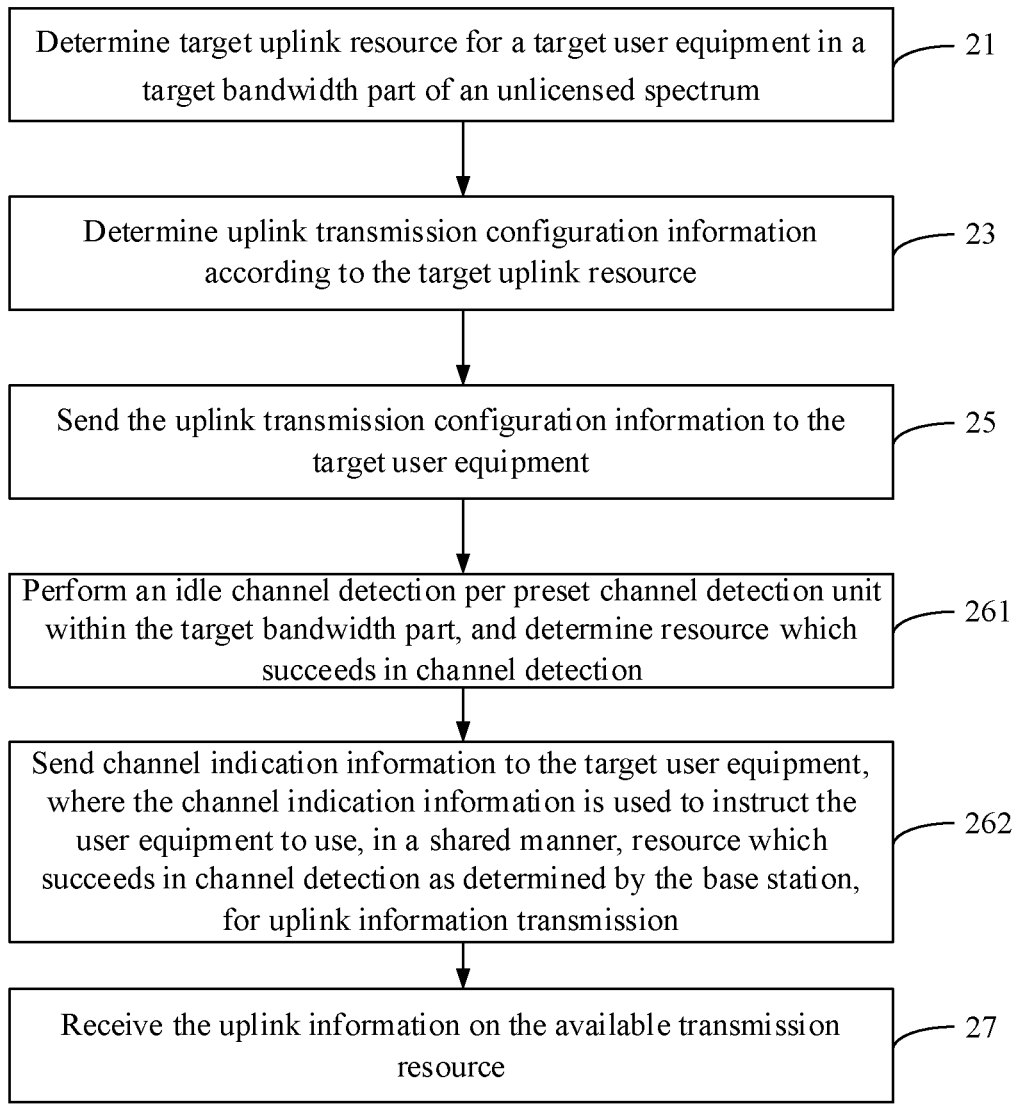
FIG. 15 is a flowchart illustrating another method of transmitting uplink information according to an example of the present disclosure.

Referring to the flowchart illustrating another method of transmitting uplink information according to an example in FIG. 15, after the above step 25, the method can further include the following steps 261 and 262.

At step 261, an idle channel detection is performed per preset channel detection unit within the target bandwidth part, and a resource which succeeds in channel detection is determined.

This step is similar to the approach that the UE performs the idle channel detection, that is, performs the idle channel detection such as LBT detection, per preset channel detection unit, in the frequency range corresponding to the target bandwidth part, to determine the resource which succeeds in the channel detection.

At step 262, channel indication information is sent to the target user equipment, where the channel indication information is configured to instruct the user equipment to use a resource which succeeds in channel detection as determined and shared by the base station, for uplink information transmission.

In the examples of the present disclosure, the base station performs channel detection and informs the target UE on which part of the target uplink resource it can perform uplink transmission, which can reduce the workload of the target UE and save the power consumption of the target UE.

At step 27, the uplink information is received on the available transmission resource.

Figure 16:
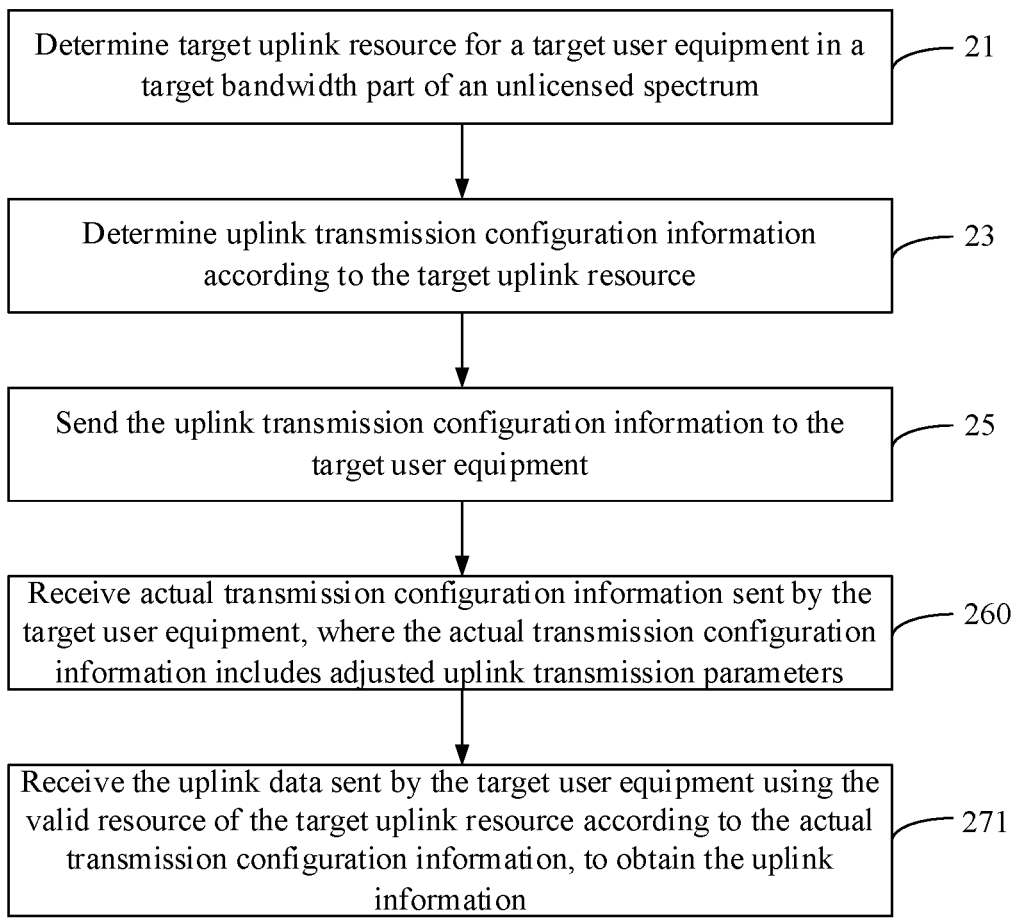
FIG. 16 is a flowchart illustrating another method of transmitting uplink information according to an example of the present disclosure.

Referring to a flowchart illustrating another method of transmitting uplink information according to an example in FIG. 16, prior to step 27, the method can further include:

At step 260, actual transmission configuration information sent by the target user equipment is received, where the actual transmission configuration information includes adjusted uplink transmission parameters.

This step corresponds to step 1532 in FIG. 13 in the third implementation of step 15 above. For the specific implementation process, reference can be made to the description of step 1532.

Correspondingly, the above step 27 can specifically be:

At step 271, the uplink data sent by the target user equipment using the valid resource of the target uplink resource is received according to the actual transmission configuration information, to obtain the uplink information.

In the examples of the present disclosure, the base station can receive the uplink information sent by the target UE according to the actual transmission configuration information sent by the target UE, which can improve the efficiency and accuracy of the base station in obtaining uplink information.

In an example of the present disclosure, corresponding to an implementation of step 15121 in the first implementation of step 15 above, prior to step 27, the method can further include:

sending preset transmission threshold information to the target user equipment, so that the target user equipment matches the preset transmission threshold information to the target modulation-coding scheme, to obtain a preset transmission threshold corresponding to the target modulation-coding scheme.

The preset transmission threshold information includes: a correspondence relationship between modulation-coding scheme and transmission threshold.

For the specific implementation of this step, reference can be made to the description of step 15121 above, which will not be repeated here.

In another example of the present disclosure, corresponding to the third implementation of step 15 and step 15312 in FIG. 12, prior to step 27, the method can further include:

sending preset coding configuration information to the target user equipment, so that the target user equipment adjusts the original modulation-coding scheme according to the channel detection information and the preset coding configuration information.

The preset coding configuration information includes: a correspondence relationship between resource ratio and variation in modulation-coding schemes.

In an example, the above step can be after the above step 262.

For the method examples, for the purpose of simple description, they are all described as a series of combined actions, but those skilled in the art should know that the present disclosure is not limited by the described sequence of actions, since according to the present disclosure, some steps can be performed in other order or simultaneously.

Further, those skilled in the art should also appreciate that the examples described in the specification are optional examples, and the actions and modules involved are not necessarily required by the present disclosure.

Corresponding to the method examples that implement application functions, the present disclosure also provides examples of apparatus that implement application functions and corresponding user equipment.

Figure 17:
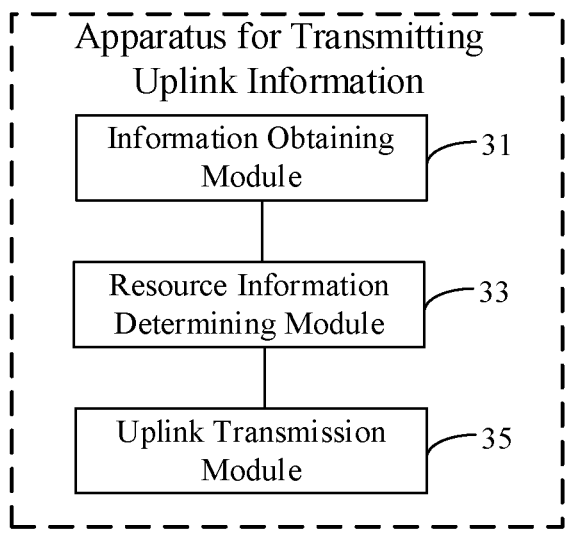
FIG. 17 is a block diagram illustrating an apparatus for transmitting uplink information according to an example of the present disclosure.

Referring to a block diagram illustrating an apparatus for transmitting uplink information according to an example in FIG. 17, which is provided in user equipment of a 5G NR system, and the apparatus can include:

an information obtaining module 31 configured to obtain uplink transmission configuration information sent by a base station, wherein the uplink transmission configuration information comprises at least: a time-frequency range of target uplink resource, the target uplink resource is uplink transmission resource allocated by the base station to the user equipment in a target bandwidth part of an unlicensed spectrum;

a resource information determining module 33 configured to determine channel detection information of the target uplink resource, wherein the channel detection information comprises: information indicating valid resource and information indicating invalid resource, the invalid resource is resource in the target uplink resource which fails in channel detection; and the valid resource is resource in the target uplink resource which succeeds in channel detection; and an uplink transmission module 35 configured to, when invalid resource exists in the target uplink resource, determine a mode for transmitting the uplink information on available transmission resource according to the channel detection information.

In an apparatus example of the present disclosure, the resource information determining module 32 can be configured to obtain channel indication information sent by the base station, and determining the channel detection information corresponding to the target uplink resource, wherein the channel indication information instructs the user equipment to use the resource which succeeds in the channel detection as determined and shared by the base station, for uplink information transmission, and the target uplink resource comprises the resource which succeeds in the channel detection.

Figure 18:
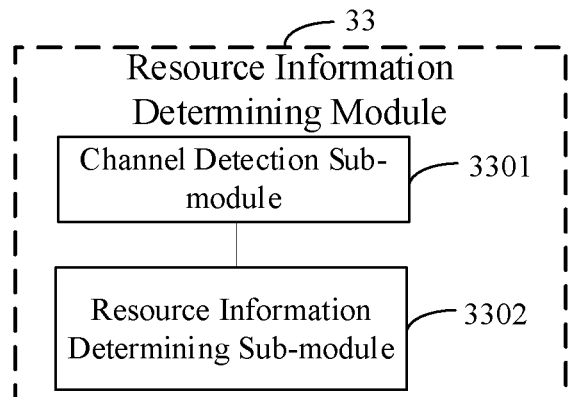
FIG. 18 is a block diagram illustrating another apparatus for transmitting uplink information according to an example of the present disclosure.

Referring to the block diagram illustrating another apparatus for transmitting uplink information according to an example in FIG. 18, on the basis of the apparatus example shown in FIG. 17, the resource information determining module 33 can include:

a channel detection submodule 3301 configured to perform idle channel detection per preset channel detection unit within the target bandwidth part to obtain a channel detection result;

a resource information determining submodule 3302 configured to determine channel detection information corresponding to the target uplink resource according to the channel detection result.

Figure 19:
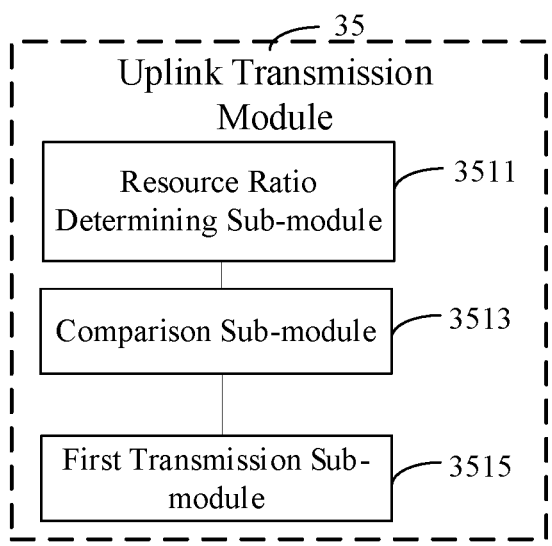
FIG. 19 is a block diagram illustrating another apparatus for transmitting uplink information according to an example of the present disclosure.

Referring to a block diagram illustrating another apparatus for transmitting uplink information according to an example in FIG. 19, on the basis of any of the apparatus examples shown in FIG. 17 or FIG. 18, the uplink transmission module 35 can include:

a resource ratio determining submodule 3511 configured to determine a resource ratio of the invalid resource or the valid resource to the target uplink resource according to the channel detection information;

a comparison submodule 3513 configured to compare the resource ratio with a preset transmission threshold to obtain a comparison result; and a first transmission submodule 3515 configured to determine a mode for transmitting the uplink information on the available transmission resource according to the comparison result.

In another apparatus example of the present disclosure, the resource ratio includes an invalid resource ratio, and the invalid resource ratio represents a resource ratio of the invalid resource to the target uplink resource.

The comparison submodule 3513 can be configured to determine whether the invalid resource ratio is less than a preset invalid transmission threshold, wherein the preset invalid transmission threshold is a preset transmission threshold related to invalid resource.

The first transmission submodule 3515 can be configured to transmit the uplink information using the valid resource in response to that the invalid resource ratio is less than the preset invalid transmission threshold.

Figure 20:
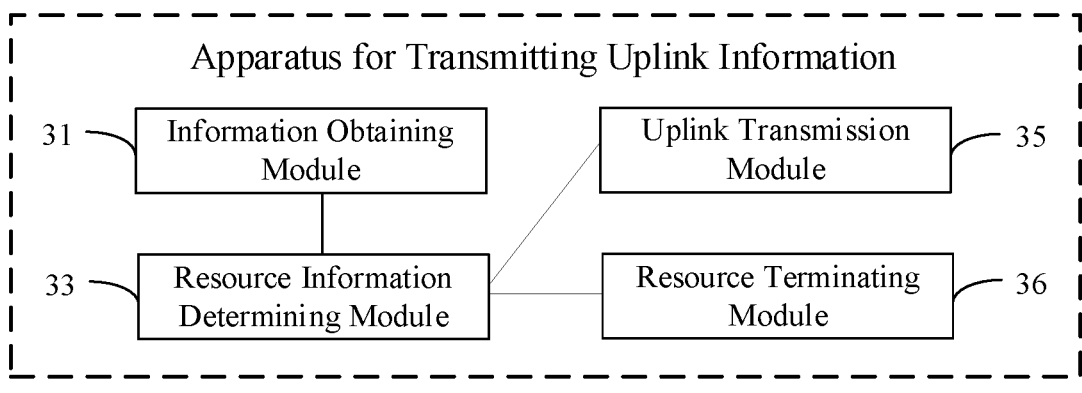
FIG. 20 is a block diagram illustrating another apparatus for transmitting uplink information according to an example of the present disclosure.

Referring to the block diagram illustrating another apparatus for transmitting uplink information according to an example in FIG. 20, based on the apparatus example shown in FIG. 19, the apparatus can further include:

a resource terminating module 36 configured to terminate transmission of the uplink information on the target uplink resource in response to that the invalid resource ratio is greater than or equal to the preset invalid transmission threshold.

Figure 21:
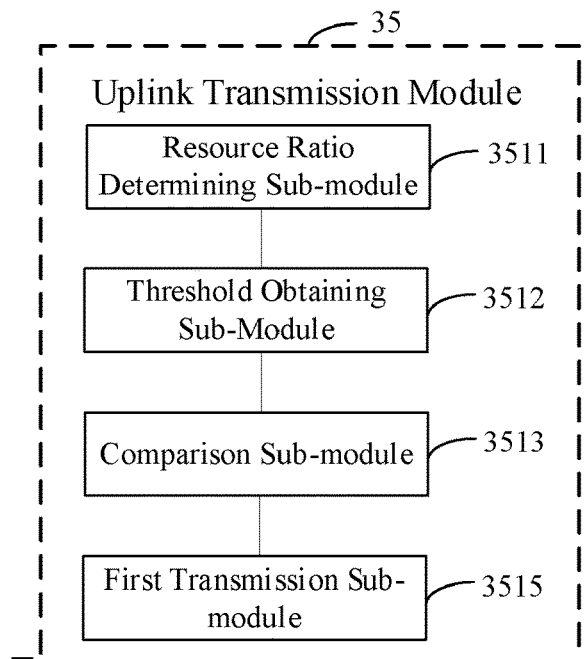
FIG. 21 is a block diagram illustrating another apparatus for transmitting uplink information according to an example of the present disclosure.

Referring to a block diagram illustrating another apparatus for transmitting uplink information according to an example in FIG. 21, based on the apparatus example shown in FIG. 19, the uplink transmission module 35 can further include:

a threshold obtaining submodule 3512 configured to obtain the preset transmission threshold.

In another apparatus example of the present disclosure, the uplink transmission configuration information can further include: a target modulation-coding scheme.

Figure 22:
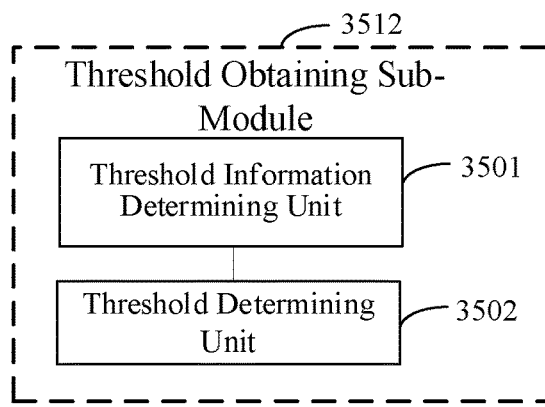
FIG. 22 is a block diagram illustrating another apparatus for transmitting uplink information according to an example of the present disclosure.

Referring to a block diagram illustrating another apparatus for transmitting uplink information according to an example in FIG. 22, on the basis of the apparatus example shown in FIG. 21, the threshold obtaining submodule 3512 can include:
- a threshold information determining unit 3501 configured to determine preset transmission threshold information, wherein the preset transmission threshold information comprises: a correspondence relationship between modulation-coding schemes and transmission thresholds;
- a threshold determining unit 3502 configured to search the preset transmission threshold information for the target modulation-coding scheme to obtain the preset transmission threshold corresponding to the target modulation-coding scheme.

Figure 23:
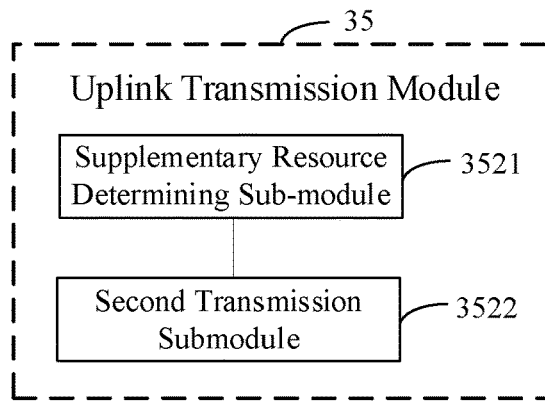
FIG. 23 is a block diagram illustrating another apparatus for transmitting uplink information according to an example of the present disclosure.

Referring to a block diagram illustrating another apparatus for transmitting uplink information according to an example in FIG. 23, on the basis of any of the apparatus examples shown in FIG. 7 or FIG. 8, the uplink transmission module 35 can include:
- a supplementary resource determining submodule 3521 configured to determine supplementary uplink resource according to the target uplink resource;
- a second transmission submodule 3522 configured to transmit the uplink information using the available transmission resource, wherein the available transmission resource at least comprises the supplementary uplink resource.

In another apparatus example of the present disclosure, the supplementary resource determining submodule 3521 can be configured to determine the supplementary uplink resource according to the time-frequency range of the target uplink resource; the supplementary uplink resource is not less than the target uplink resource, and the supplementary uplink resource is different from the target uplink resource in time domain and/or frequency domain.

In another apparatus example of the present disclosure, the supplementary resource determining submodule 3521 can also be configured to determine the supplementary uplink resource according to the information corresponding to the invalid resource;

Correspondingly, the second transmission submodule 3522 can be configured to transmit the uplink information using the valid resource and the supplementary uplink resource.

In another apparatus example of the present disclosure, the supplementary resource determining submodule 3521 can be configured to determine supplementary uplink resource according to the target uplink resource based on preset supplementary resource configuration information.

In an apparatus example of the present disclosure, the supplementary uplink resource can be a resource being the same in the time domain but different in the frequency domain as the target uplink transmission resource.

Figure 24:
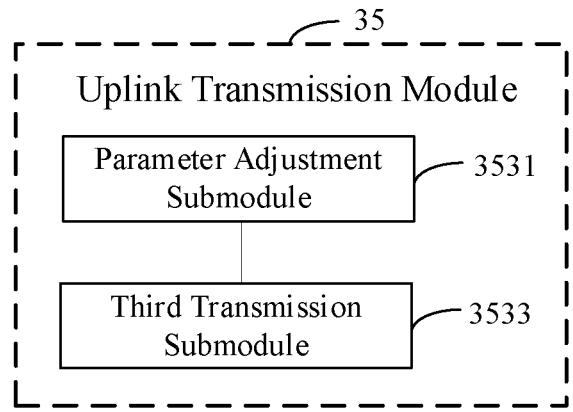
FIG. 24 is a block diagram illustrating another apparatus for transmitting uplink information according to an example of the present disclosure.

In an apparatus example of the present disclosure, the uplink transmission configuration information can further include: original transmission configuration information used to inform the user equipment of the mode for uplink transmission;

Correspondingly, referring to the block diagram of another apparatus for transmitting uplink information according to an example in FIG. 24, on the basis of any one of the apparatus examples shown in FIG. 7 or FIG. 8, the uplink transmission module 35 can include:
- a parameter adjustment submodule 3531 configured to adjust uplink transmission parameters according to the channel detection information and the original transmission configuration information;
- a third transmission submodule 3533 configured to transmit the uplink information using the valid resource based on the adjusted uplink transmission parameters.

In an apparatus example of the present disclosure, the original transmission configuration information can include: the original modulation-coding scheme corresponding to the target uplink resource.

Figure 25:
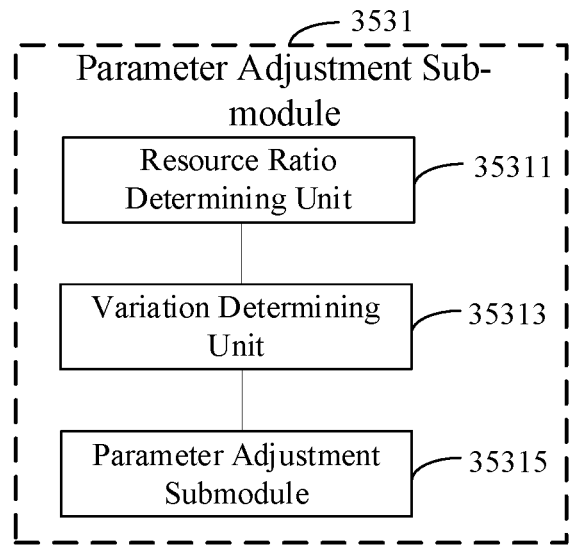
FIG. 25 is a block diagram illustrating another apparatus for transmitting uplink information according to an example of the present disclosure.

Referring to a block diagram illustrating another apparatus for transmitting uplink information according to an example in FIG. 25, based on the apparatus example shown in FIG. 24, the parameter adjustment submodule 3531 can include:
- a resource ratio determining unit 35311 configured to determine a resource ratio of the invalid resource or the valid resource in the target uplink resource according to the channel detection information;
- a variation determining unit 35313 configured to search preset coding configuration information according to the resource ratio, and determine a target variation corresponding to the resource ratio, where the preset coding configuration information includes: a correspondence relationship between resource ratios and variations in the modulation-coding scheme;
- a parameter adjustment unit 35315 configured to determine an adjusted modulation-coding scheme according to the original modulation-coding scheme and the target variation.

Figure 26:
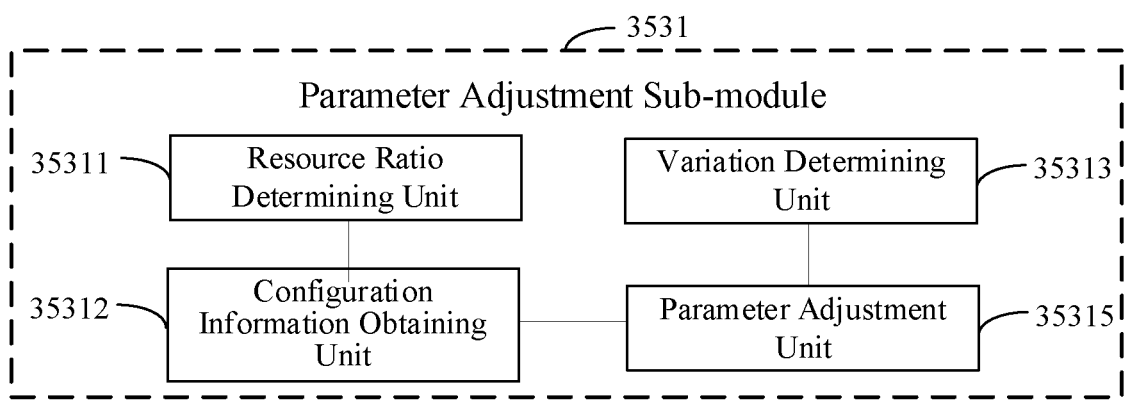
FIG. 26 is a block diagram illustrating another apparatus for transmitting uplink information according to an example of the present disclosure.

Referring to a block diagram illustrating another apparatus for transmitting uplink information according to an example in FIG. 26, based on the apparatus example shown in FIG. 25, the parameter adjustment submodule 3531 can further include:
- a configuration information obtaining unit 35312 configured to obtain the preset coding configuration information sent by the base station.

Figure 27:
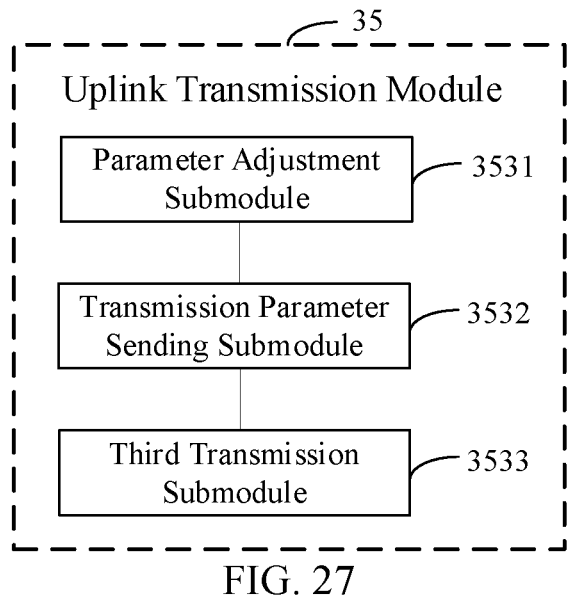
FIG. 27 is a block diagram illustrating another apparatus for transmitting uplink information according to an example of the present disclosure.

Referring to a block diagram illustrating another apparatus for transmitting uplink information according to an example in FIG. 27, based on the apparatus example shown in FIG. 24, the uplink transmission module 35 can further include:
- a transmission parameter sending submodule 3532 configured to send actual transmission configuration information to the base station based on the adjusted uplink transmission parameters, so that the base station obtains the uplink information according to the actual transmission configuration information.

Correspondingly, the present disclosure also provides an apparatus for transmitting uplink information, which is provided in a base station of the 5G NR system.

Figure 28:
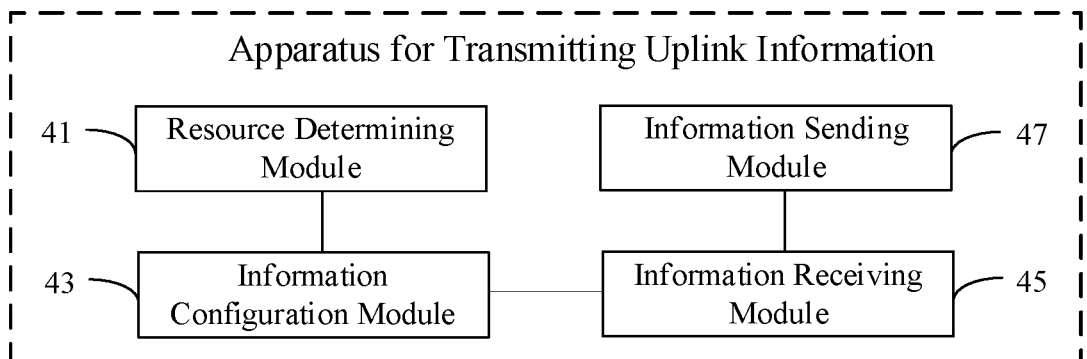
FIG. 28 is a block diagram illustrating an apparatus for transmitting uplink information according to an example of the present disclosure.

Referring to a block diagram of an apparatus for transmitting uplink information according to an example in FIG. 28, the apparatus can include:
- a resource determining module 41 configured to determine target uplink resource for a target user equipment in a target bandwidth part of an unlicensed spectrum;
- an information configuration module 43 configured to determine uplink transmission configuration information according to the target uplink resource;
- an information sending module 45 configured to send the uplink transmission configuration information to the target user equipment, so that the target user equipment determines channel detection information corresponding to the target uplink resource, and when invalid resource which fails in channel detection exists on the target uplink resource, determines a mode for transmitting uplink information on available transmission resource based on the channel detection information;

an information receiving module 47 configured to receive the uplink information on the available transmission resource.

Figure 29:
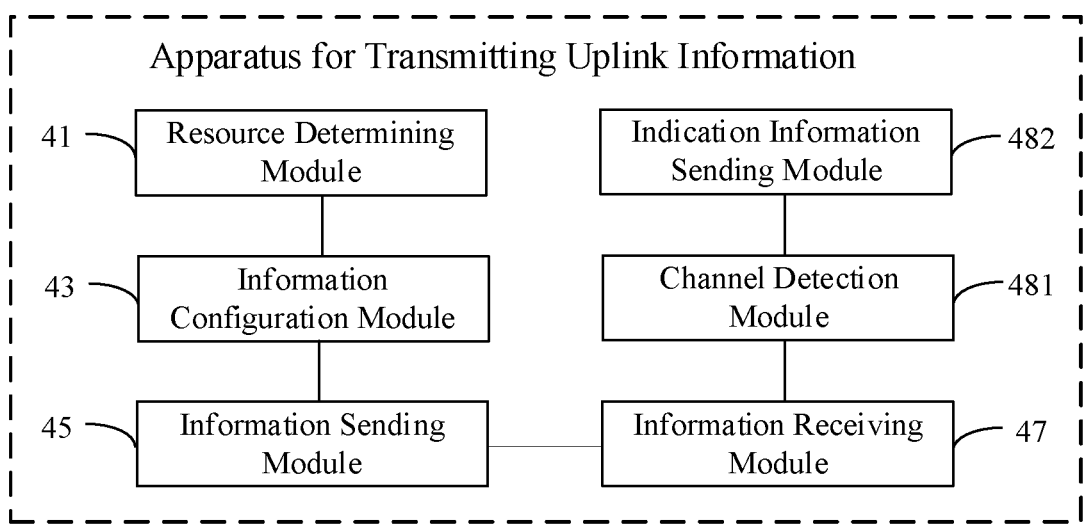
FIG. 29 is a block diagram illustrating another apparatus for transmitting uplink information according to an example of the present disclosure.

Referring to a block diagram illustrating another apparatus for transmitting uplink information according to an example in FIG. 29, based on the apparatus example shown in FIG. 28, the apparatus can further include:

a channel detection module 481 configured to perform an idle channel detection per preset channel detection unit within the target bandwidth part, and determine resource which succeeds in channel detection;

an indication information sending module 482 configured to send channel indication information to the target user equipment, where the channel indication information is used to instruct the user equipment to use, in a shared manner, resource which succeeds in channel detection as determined by the base station, for uplink information transmission.

In another apparatus example of the present disclosure, the uplink transmission configuration information includes: a target modulation-coding scheme, and the apparatus can further include:

a threshold information sending module configured to send preset transmission threshold information to the target user equipment, so that the target user equipment matches the preset transmission threshold information to the target modulation-coding scheme, to obtain a preset transmission threshold corresponding to the target modulation-coding scheme;

where the preset transmission threshold information includes: a correspondence relationship between modulation-coding schemes and transmission thresholds.

In another apparatus example of the present disclosure, the uplink transmission configuration information can include: the original modulation-coding scheme corresponding to the target uplink resource, and the apparatus can further include:

a preset configuration information sending module configured to send preset coding configuration information to the target user equipment, so that the target user equipment adjusts the original modulation-coding scheme according to the channel detection information and the preset coding configuration information, where the preset coding configuration information includes: the correspondence relationship between resource ratios and variations in the modulation-coding scheme.

In another apparatus example of the present disclosure, the apparatus can further include:

a transmission parameter receiving module configured to receive actual transmission configuration information sent by the target user equipment, where the actual transmission configuration information includes: adjusted uplink transmission parameters.

The information receiving module 47 can be configured to receive the uplink data sent by the target user equipment using the valid resource of the target uplink resource according to the actual transmission configuration information, to obtain the uplink information. The valid resource is resource in the target uplink resource which succeeds in channel detection.

As for the apparatus example, since it basically corresponds to the method example, reference can be made to the part of the description of the method example for related parts. The apparatus examples described above are merely illustrative. The units described above as separate components can or cannot be physically separated, and the components displayed as units can or cannot be physical units, that is, they can be located in one unit, or it can be distributed to multiple network units. Some or all of the modules can be selected according to actual needs to achieve the objectives of the solutions of the present disclosure. Those of ordinary skill in the art can understand and implement without creative work.

Correspondingly, in one aspect, user equipment is provided, including:

a processor;

memory for storing processor executable instructions;

wherein the processor is configured to:

obtain uplink transmission configuration information sent by a base station, where the uplink transmission configuration information includes at least: a time-frequency range of target uplink resource, the target uplink resource is uplink transmission resource allocated by the base station to the user equipment in a target bandwidth part of an unlicensed spectrum;

determine channel detection information corresponding to the target uplink resource, where the channel detection information includes: information indicating valid resource and information indicating invalid resource, the invalid resource is resource in the target uplink resource which fails in channel detection; and the valid resource is resource in the target uplink resource which succeeds in channel detection;

when invalid resource exists in the target uplink resource, determine a mode for transmitting the uplink information on available transmission resource according to the channel detection information.

On the other hand, a base station is provided, including:

a processor;

memory for storing processor executable instructions;

wherein the processor is configured to:

determine target uplink resource for a target user equipment in a target bandwidth part of an unlicensed spectrum;

determine uplink transmission configuration information according to the target uplink resource;

send the uplink transmission configuration information to the target user equipment, so that the target user equipment determines channel detection information corresponding to the target uplink resource, and when invalid resource exists on the target uplink resource, determines a mode for transmitting uplink information on available transmission resource based on the channel detection information;

receive the uplink information on the available transmission resource.

Figure 30:
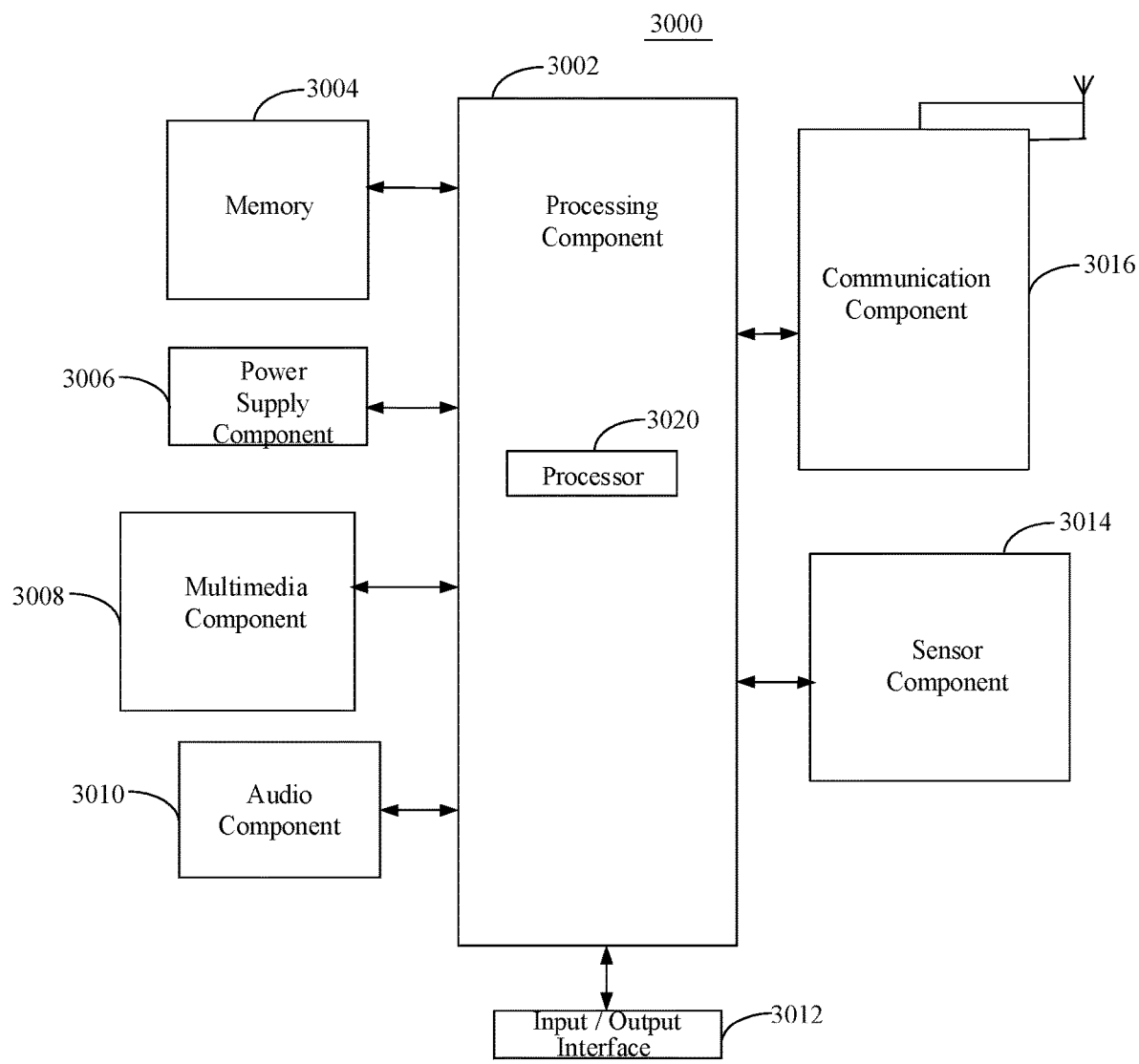
FIG. 30 is a block diagram illustrating user equipment according to an example of the present disclosure.

FIG. 30 is a block diagram illustrating a structure of user equipment 3000 according to an example. For example, the user equipment 3000 can be user equipment, such as a mobile phone, a computer, a digital broadcasting terminal, a messaging device, a game console, a tablet device, a medical device, fitness equipment, a personal digital assistant, a wearable device such as a smart watch, smart glasses, a smart band, smart sneakers, or the like.

As shown in FIG. 30, the user equipment 3000 can include one or more of the following components: a processing component 3002, memory 3004, a power supply component 3006, a multimedia component 3008, an audio component 3010, an input/output (I/O) interface 3012, a sensor component 3014, and a communication component 3016.

The processing component 3002 generally controls overall operations of the user equipment 3000, such as operations associated with display, phone calls, data communications, camera operations, and recording operations. The processing component 3002 can include one or more processors 3020 to execute instructions to complete all or part of the steps of the above methods. In addition, the processing component 3002 can include one or more modules which facilitate the interaction between the processing component 3002 and other components. For example, the processing component 3002 can include a multimedia module to facilitate the interaction between the multimedia component 3008 and the processing component 3002.

The memory 3004 is to store various types of data to support the operation of the user equipment 3000. Examples of such data include instructions for any application or method operated on the user equipment 3000, contact data, phonebook data, messages, pictures, videos, and so on. The memory 3004 can be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 3006 supplies power for different components of the user equipment 3000. The power supply component 3006 can include a power supply management system, one or more power supplies, and other components associated with generating, managing and distributing power for the user equipment 3000.

The multimedia component 3008 includes a screen providing an output interface between the user equipment 3000 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 3008 can include a front camera and/or a rear camera. The front camera and/or rear camera can receive external multimedia data when the user equipment 3000 is in an operating mode, such as a photographing mode or a video mode. Each of the front camera and the rear camera can be a fixed optical lens system or have focal length and optical zooming capability.

The audio component 3010 is to output and/or input an audio signal. For example, the audio component 3010 includes a microphone (MIC). When the user equipment 3000 is in an operating mode, such as a call mode, a record mode and a voice recognition mode, the microphone is to receive an external audio signal. The received audio signal can be further stored in the memory 3004 or sent via the communication component 3016. In some examples, the audio component 3010 further includes a speaker for outputting an audio signal.

The I/O interface 3012 provides an interface between the processing component 3002 and a peripheral interface module. The above peripheral interface module can be a keyboard, a click wheel, buttons, or the like. These buttons can include but not limited to, a home button, a volume button, a start button and a lock button.

The sensor component 3014 includes one or more sensors to provide status assessments of various aspects for the user equipment 3000. For example, the sensor component 3014 can detect the on/off status of the user equipment 3000, and relative positioning of component, for example, the component is a display and a keypad of the user equipment 3000. The sensor component 3014 can also detect a change in position of the user equipment 3000 or a component of the user equipment 3000, a presence or absence of the contact between a user and the user equipment 3000, an orientation or an acceleration/deceleration of the user equipment 3000, and a change in temperature of the user equipment 3000. The sensor component 3014 can include a proximity sensor to detect the presence of a nearby object without any physical contact. The sensor component 3014 can further include an optical sensor, such as a Complementary Metal-Oxide-Semiconductor (CMOS) or Charged Coupled Device (CCD) image sensor which is used in imaging applications. In some examples, the sensor component 3014 can further include an acceleration sensor, a gyroscope sensor, a magnetic sensor, a pressure sensor, or a temperature sensor.

The communication component 3016 is to facilitate wired or wireless communication between the user equipment 3000 and other devices. The user equipment 3000 can access a wireless network based on a communication standard, such as Wi-Fi, 2G, 3G, 4G LTE, 5G NR systems or a combination thereof. In an example, the communication component 3016 receives a broadcast signal or broadcast related information from an external broadcast management system via a broadcast channel. In an example, the communication component 3016 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the user equipment 3000 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, a non-transitory computer readable storage medium including instructions is further provided, such as the memory 3004 including instructions. The above instructions can be executed by the processor 3020 of the user equipment 3000 to complete the method of transmitting uplink information described with any one of FIGS. 1-13. For example, the non-transitory computer readable storage medium can be a Read-Only Memory (ROM), a Random-Access Memory (RAM), a CD-ROM, a magnetic tape, a floppy disk, an optical data storage device, and so on.

Figure 31:
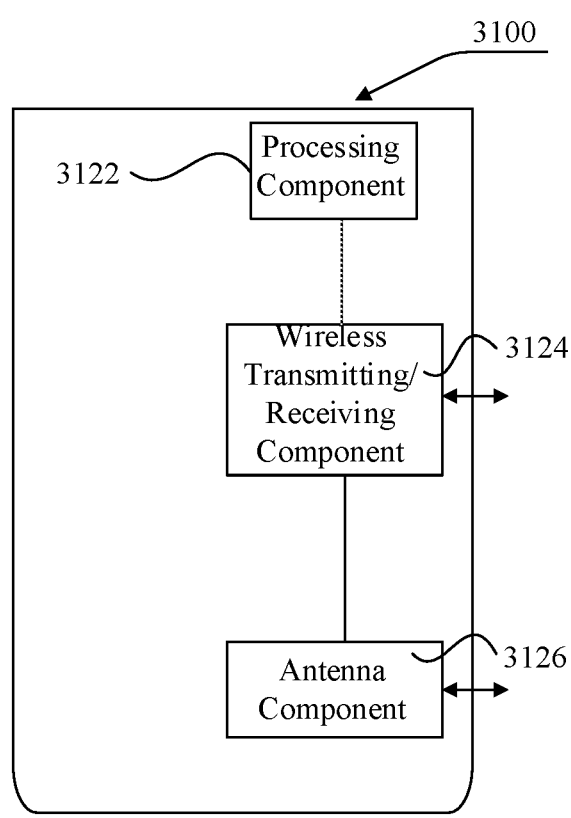
FIG. 31 is a block diagram illustrating a base station according to an example of the present disclosure.

As shown in FIG. 31, FIG. 31 is a schematic structural diagram of a base station 3100 according to an example. Referring to FIG. 31, the base station 3100 includes a processing component 3122, a wireless transmitting/receiving component 3124, an antenna component 3131, and a signal processing section specific to a wireless interface. The processing component 3122 may further include one or more processors.

One of the processors in the processing component 3122 can be configured to:
    determine target uplink resource for a target user equipment in a target bandwidth part of an unlicensed spectrum;
    determine uplink transmission configuration information according to the target uplink resource;

send the uplink transmission configuration information to the target user equipment, so that the target user equipment determines channel detection information corresponding to the target uplink resource, and when invalid resource exists on the target uplink resource, determines a mode for transmitting uplink information on available transmission resource based on the channel detection information;

receive the uplink information on the available transmission resource.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A method of transmitting uplink information, being applicable to user equipment of a new radio (NR) system, comprising:

obtaining uplink transmission configuration information sent by a base station, wherein the uplink transmission configuration information comprises at least: a time-frequency range of a target uplink resource which is an uplink transmission resource allocated by the base station for the user equipment in a target bandwidth part of an unlicensed spectrum;

determining channel detection information corresponding to the target uplink resource, wherein the channel detection information comprises: information corresponding to a valid resource and information corresponding to an invalid resource, the invalid resource is a resource in the target uplink resource which fails in channel detection; and the valid resource is a resource in the target uplink resource which succeeds in channel detection; and in response to that the invalid resource exists in the target uplink resource, determining a mode for transmitting the uplink information on an available transmission resource according to the channel detection information;

wherein the uplink transmission configuration information further comprises: original transmission configuration information configured to inform the user equipment of the mode for uplink transmission;

wherein said determining the mode for transmitting the uplink information on the available transmission resource according to the channel detection information comprises:

adjusting uplink transmission parameters according to the channel detection information and the original transmission configuration information; and transmitting the uplink information using the valid resource based on the adjusted uplink transmission parameters;

wherein the original transmission configuration information comprises: an original modulation-coding scheme corresponding to the target uplink resource;

wherein adjusting the uplink transmission parameters according to the channel detection information and the original transmission configuration information comprises:

determining a resource ratio of the invalid resource or the valid resource to the target uplink resource according to the channel detection information;

querying preset coding configuration information according to the resource ratio to determine a target variation corresponding to the resource ratio, wherein the preset coding configuration information comprises: a correspondence relationship between resource ratio and variation in the modulation-coding scheme; and determining an adjusted modulation-coding scheme according to the original modulation-coding scheme and the target variation; and wherein prior to querying the preset coding configuration information according to the resource ratio to determine the target variation corresponding to the resource ratio, the method further comprises:

obtaining the preset coding configuration information sent by the base station.

2. The method of claim 1, wherein said determining the channel detection information corresponding to the target uplink resource comprises:

obtaining channel indication information sent by the base station, and determining the channel detection information corresponding to the target uplink resource, wherein the channel indication information instructs the user equipment to use the resource which succeeds in the channel detection as determined and shared by the base station, for uplink information transmission, and the target uplink resource comprises the resource which succeeds in the channel detection.

3. The method of claim 1, wherein said determining the channel detection information corresponding to the target uplink resource comprises:

performing idle channel detection per preset channel detection unit within the target bandwidth part to obtain a channel detection result of each preset channel detection units, wherein the target bandwidth part comprises a plurality of preset channel detection units; and determining the channel detection information corresponding to the target uplink resource according to the channel detection result of each preset channel detection unit.

4. The method of claim 1, wherein said determining the mode for transmitting the uplink information on the available transmission resource according to the channel detection information further comprises:

determining a resource ratio of the invalid resource or the valid resource to the target uplink resource according to the channel detection information;

comparing the resource ratio with a preset transmission threshold to obtain a comparison result; and determining the mode for transmitting the uplink information on the available transmission resource according to the comparison result.

5. The method of claim 4, wherein the resource ratio comprises an invalid resource ratio which represents a resource ratio of the invalid resource to the target uplink resource;

wherein comparing the resource ratio with the preset transmission threshold comprises:

determining whether the invalid resource ratio is less than a preset invalid transmission threshold, wherein the preset invalid transmission threshold is a preset transmission threshold related to the invalid resource;

wherein said determining the mode for transmitting the uplink information on the available transmission resource according to the comparison result comprises:

in response to that the invalid resource ratio is less than the preset invalid transmission threshold, transmitting the uplink information using the valid resource; and the method further comprising:

in response to that the invalid resource ratio is greater than or equal to the preset invalid transmission threshold, terminating transmission of the uplink information on the target uplink resource.

6. The method of claim 4, wherein the uplink transmission configuration information further comprises: a target modulation-coding scheme, prior to comparing the resource ratio with the preset transmission threshold, the method further comprises:

determining preset transmission threshold information, wherein the preset transmission threshold information comprises: a correspondence relationship between modulation-coding scheme and transmission threshold; and searching the preset transmission threshold information for the target modulation-coding scheme to obtain the preset transmission threshold corresponding to the target modulation-coding scheme.

7. The method of claim 1, wherein said determining the mode for transmitting the uplink information on the available transmission resource according to the channel detection information further comprises:

determining a supplementary uplink resource according to the target uplink resource; and transmitting the uplink information using the available transmission resource, wherein the available transmission resource at least comprises the supplementary uplink resource.

8. The method of claim 7, wherein said determining the supplementary uplink resource according to the target uplink resource comprises:

determining the supplementary uplink resource according to a time-frequency range of the target uplink resource; wherein a resource amount of the supplementary uplink resource is not less than that of the target uplink resource, and the supplementary uplink resource is different from the target uplink resource in time domain and/or frequency domain.

9. The method of claim 7, wherein said determining the supplementary uplink resource according to the target uplink resource comprises:

determining the supplementary uplink resource according to the information corresponding to the invalid resource;

wherein transmitting the uplink information using available transmission resource comprises:

transmitting the uplink information using the valid resource and the supplementary uplink resource.

10. The method of claim 7, wherein said determining the supplementary uplink resource according to the target uplink resource comprises:

determining the supplementary uplink resource according to the target uplink resource based on preset supplementary resource configuration information.

11. The method of claim 1, further comprising:

sending actual transmission configuration information to the base station based on the adjusted uplink transmission parameters, so that the base station obtains the uplink information according to the actual transmission configuration information.

12. A method of transmitting uplink information, being applicable to a new radio (NR) system comprising a base station and target user equipment, and the method comprising:

determining, by the base station, a target uplink resource for the target user equipment in a target bandwidth part of an unlicensed spectrum allocated by the base station for the target user equipment;

determining, by the base station, uplink transmission configuration information according to the target uplink resource;

sending, by the base station, the uplink transmission configuration information to the target user equipment;

determining, by the target user equipment, channel detection information corresponding to the target uplink resource;

when an invalid resource which fails in channel detection exists on the target uplink resource, determining, by the target user equipment, a mode for transmitting uplink information on an available transmission resource based on the channel detection information; and receiving, by the base station, the uplink information on the available transmission resource;

wherein the uplink transmission configuration information further comprises: original transmission configuration information configured to inform the user equipment of the mode for uplink transmission;

wherein determining, by the target user equipment, the mode for transmitting the uplink information on the available transmission resource according to the channel detection information comprises:

adjusting, by the target user equipment, uplink transmission parameters according to the channel detection information and the original transmission configuration information; and transmitting, by the target user equipment, the uplink information using the valid resource based on the adjusted uplink transmission parameters:

wherein the original transmission configuration information comprises: an original modulation-coding scheme corresponding to the target uplink resource;

wherein adjusting, by the target user equipment, the uplink transmission parameters according to the channel detection information and the original transmission configuration information comprises:

determining, by the target user equipment, a resource ratio of the invalid resource or the valid resource to the target uplink resource according to the channel detection information;

querying, by the target user equipment, preset coding configuration information according to the resource ratio to determine a target variation corresponding to the resource ratio, wherein the preset coding configuration information comprises: a correspondence relationship between resource ratio and variation in the modulation-coding scheme; and determining, by the target user equipment, an adjusted modulation-coding scheme according to the original modulation-coding scheme and the target variation; and wherein prior to querying the preset coding configuration information according to the resource ratio to determine the target variation corresponding to the resource ratio, the method further comprises:
obtaining, by the target user equipment, the preset coding configuration information sent by the base station.

13. The method of claim 12, further comprising:
performing, by the base station, idle channel detection per preset channel detection unit within the target bandwidth part, and determining a resource which succeeds in channel detection; and
sending, by the base station, channel indication information to the target user equipment, wherein the channel indication information instructs the target user equipment to use the resource which succeeds in the channel detection as determined and shared by the base station, for uplink information transmission.

14. The method of claim 12, wherein the uplink transmission configuration information comprises a target modulation-coding scheme, and the method further comprises:
sending, by the base station, preset transmission threshold information to the target user equipment, so that the target user equipment searches the preset transmission threshold information for the target modulation-coding scheme, to obtain a preset transmission threshold corresponding to the target modulation-coding scheme;
wherein the preset transmission threshold information comprises: a correspondence relationship between modulation-coding schemes and transmission thresholds.

15. The method of claim 12, wherein the uplink transmission configuration information comprises: an original modulation-coding scheme corresponding to the target uplink resource, and the method further comprises:
sending, by the base station, preset coding configuration information to the target user equipment, so that the target user equipment adjusts the original modulation-coding scheme according to the channel detection information and the preset coding configuration information;
wherein the preset coding configuration information comprises a correspondence relationship between resource ratios and variations in the modulation-coding scheme.

16. The method of claim 12, further comprising:
receiving, by the base station, actual transmission configuration information sent by the target user equipment, wherein the actual transmission configuration information comprises: adjusted uplink transmission parameters;
wherein receiving, by the base station, the uplink information on the available transmission resource comprises:
receiving, by the base station, uplink data sent by the target user equipment using a valid resource of the target uplink resource according to the actual transmission configuration information, to obtain the uplink information, wherein the valid resource is a resource in the target uplink resource which succeeds in channel detection.

17. A new radio (NR) system, comprising a base station and target user equipment, implementing the method of claim 12.

18. User equipment comprising:
a processor; and
a memory for storing processor executable instructions;
wherein the processor is configured to:
obtain uplink transmission configuration information sent by a base station, wherein the uplink transmission configuration information comprises at least: a time-frequency range of target uplink resource, the target uplink resource is uplink transmission resource allocated by the base station to the user equipment in a target bandwidth part of an unlicensed spectrum;
determine channel detection information corresponding to the target uplink resource, wherein the channel detection information comprises: information indicating valid resource and information indicating invalid resource, the invalid resource is resource in the target uplink resource which fails in channel detection; and the valid resource is resource in the target uplink resource which succeeds in channel detection; and
when invalid resource exists in the target uplink resource, determine a mode for transmitting the uplink information on available transmission resource according to the channel detection information;
wherein the uplink transmission configuration information further comprises: original transmission configuration information configured to inform the user equipment of the mode for uplink transmission;
wherein the processor is further configured to:
adjust uplink transmission parameters according to the channel detection information and the original transmission configuration information; and
transmit the uplink information using the valid resource based on the adjusted uplink transmission parameters;
wherein the original transmission configuration information comprises: an original modulation-coding scheme corresponding to the target uplink resource;
wherein the processor is further configured to:
determine a resource ratio of the invalid resource or the valid resource to the target uplink resource according to the channel detection information;
query preset coding configuration information according to the resource ratio to determine a target variation corresponding to the resource ratio, wherein the preset coding configuration information comprises: a correspondence relationship between resource ratio and variation in the modulation-coding scheme; and
determine an adjusted modulation-coding scheme according to the original modulation-coding scheme and the target variation; and
wherein prior to querying the preset coding configuration information according to the resource ratio to determine the target variation corresponding to the resource ratio, the processor is further configured to:
obtain the preset coding configuration information sent by the base station.

* * * * *